United States Patent
Cao et al.

(10) Patent No.: US 12,160,395 B2
(45) Date of Patent: Dec. 3, 2024

(54) PILOT DESIGN FOR DISTRIBUTED RESOURCE UNITS

(71) Applicant: NXP USA, Inc., Austin, TX (US)

(72) Inventors: Rui Cao, Sunnyvale, CA (US); Ying Liu, Sunnyvale, CA (US); Dong Wei, Austin, TX (US); Yan Zhang, Palo Alto, CA (US)

(73) Assignee: NXP USA, Inc., Austin, TX (US)

( * ) Notice: Subject to any disclaimer, the term of this patent is extended or adjusted under 35 U.S.C. 154(b) by 357 days.

(21) Appl. No.: 17/842,740

(22) Filed: Jun. 16, 2022

(65) Prior Publication Data

US 2022/0416988 A1 Dec. 29, 2022

Related U.S. Application Data

(60) Provisional application No. 63/262,473, filed on Oct. 13, 2021, provisional application No. 63/261,386, (Continued)

(51) Int. Cl.
*H04L 5/00* (2006.01)
*H04B 1/69* (2011.01)

(52) U.S. Cl.
CPC ............. *H04L 5/0094* (2013.01); *H04B 1/69* (2013.01); *H04L 5/0007* (2013.01); *H04L 5/0044* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 6,885,699 B2 * | 4/2005 | Verbin | H04L 27/3411 370/450 |
| 9,774,428 B2 | 9/2017 | Montreuil et al. | |

(Continued)

OTHER PUBLICATIONS

IEEE P802.11ax/D8.0, IEEE Draft Standard for Information technology—Telecommunications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN, Section 27.3.2 Subcarrier and Resource Allocation, and Section 27.3.12 Pilot Subcarriers, Oct. 2020, https://ieeexplore.ieee.org/document/9248710.

(Continued)

*Primary Examiner* — Hong S Cho

(57) ABSTRACT

A wireless communication system, apparatus, and methodology are described for enabling wireless communication station (STA) devices to generate a Physical Layer Protocol Data Unit (PPDU) that includes a resource unit (RU) having a size that is less than a spreading frequency block by using one or more predetermined pilot and/or data tone mapping plans to control how each pilot/data tone from the RU is distributed onto a disjoint set of pilot/data subcarriers forming a distributed RU included in the spreading frequency block, thereby accommodating transmission of wider bandwidth and multiple resource unit assignments in accordance with power spectrum density (PSD) limits provided for orthogonal frequency-division multiplexing (OFDM) modulated symbols supported by emerging 802.11 standards.

22 Claims, 19 Drawing Sheets

Related U.S. Application Data filed on Sep. 20, 2021, provisional application No. 63/224,145, filed on Jul. 21, 2021, provisional application No. 63/211,358, filed on Jun. 16, 2021.

(56) References Cited

U.S. PATENT DOCUMENTS

| | | |
|---|---|---|
| 11,902,191 B2 * | 2/2024 | Yang ................ H04L 5/003 |
| 2021/0391961 A1 | 12/2021 | Cao et al. |
| 2021/0392661 A1 | 12/2021 | Cao et al. |

OTHER PUBLICATIONS

Rui Cao et al., U.S. Appl. No. 17/752,763, filed May 24, 2022, entitled Device, System, and Method for Power Spectrum Density (PSD) Limited Transmissions.

* cited by examiner

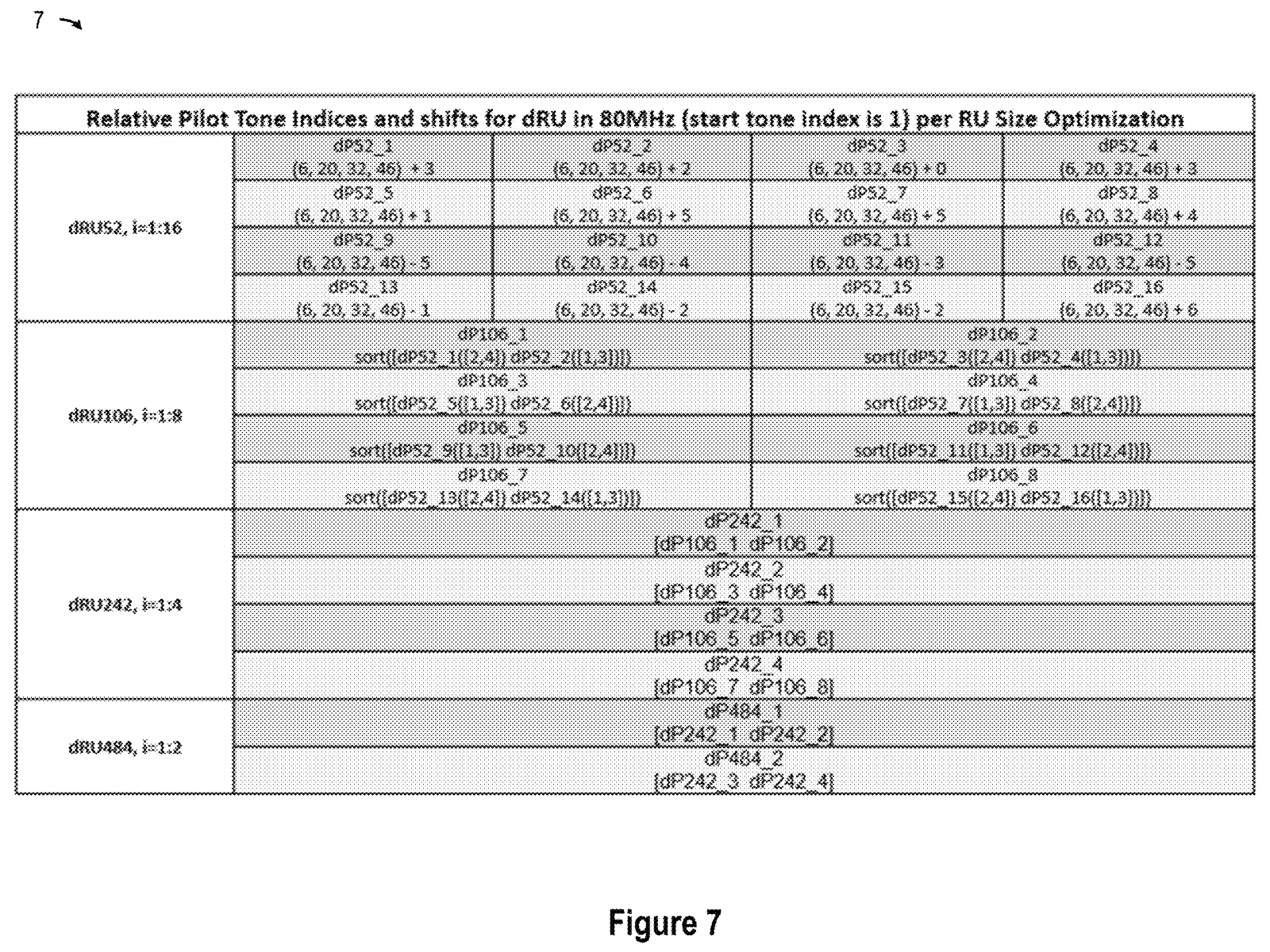

| Relative Pilot Tone Indices and shifts for dRU in 80MHz (start tone index is 1) per RU Size Optimization | | | | | | |
|---|---|---|---|---|---|---|
| dRU52, i=1:16 | (6, 20, 32, 46) + 1<br>dP52_5<br>(6, 20, 32, 46) + 5<br>dP52_9<br>(6, 20, 32, 46) + 5<br>dP52_13<br>(6, 20, 32, 46) - 1 | dP52_1<br>(6, 20, 32, 46) + 2<br>dP52_6<br>(6, 20, 32, 46) + 5<br>dP52_10<br>(6, 20, 32, 46) + 4<br>dP52_14<br>(6, 20, 32, 46) - 2 | dP52_2<br>(6, 20, 32, 46) + 2<br>dP52_7<br>dP52_11<br>dP52_15<br> | dP52_3<br>(6, 20, 32, 46) + 3<br>dP52_8<br>(6, 20, 32, 46) + 4<br>dP52_12<br>(6, 20, 32, 46) + 5<br>dP52_16<br>(6, 20, 32, 46) + 6 | dP52_4 | |
| dRU106, i=1:8 | sort([dP52_1(2,4] dP52_2(1,3]])<br>dP106_3<br>sort([dP52_5(1,3] dP52_6(2,4]])<br>dP106_5<br>sort([dP52_9(1,3] dP52_10(2,4]])<br>dP106_7 | dP106_1 | dP106_2<br>dP106_4<br>dP106_6<br>dP106_8 | sort([dP52_3(2,4] dP52_4(1,3]])<br>sort([dP52_7(1,3] dP52_8(2,4]])<br>sort([dP52_11(1,3] dP52_12(2,4]])<br>sort([dP52_13(2,4] dP52_16(1,3]]) | | |
| dRU242, i=1:4 | | | dP242_1<br>[dP106_1 dP106_2]<br>dP242_2<br>[dP106_3 dP106_4]<br>dP242_3<br>[dP106_5 dP106_6]<br>dP242_4<br>[dP106_7 dP106_8] | | | |
| dRU484, i=1:2 | | | dP484_1<br>dP242_1 dP242_2<br>dP484_2<br>dP242_3 dP242_4 | | | |

Figure 7

Relative Pilot Tone Indices and shifts for dRU in 40MHz (start tone index is 1) per RU Size Optimization

| | | | | | |
|---|---|---|---|---|---|
| dRU26, i=1:18 | dP26_1<br>(6,20)-2<br>dP26_6<br>(6,20)+2<br>dP26_10<br>(6,20)+0<br>dP26_15<br>(6,20)-5 | dP26_2<br>(6,20)+3<br>dP26_7<br>(6,20)-4<br>dP26_11<br>(6,20)+5<br>dP26_16<br>(6,20)-2 | dP26_3<br>(6,20)+4<br>dP26_8<br>(6,20)-3<br>dP26_12<br>(6,20)+6<br>dP26_17<br>(6,20)-1 | dP26_4<br>(6,20)+0<br>dP26_9<br>(6,20)-5<br>dP26_13<br>(6,20)+2<br>dP26_18<br>(6,20)+4 | dP26_5<br>(6,20)+6<br>dP26_14<br>(6,20)+1 |
| dRU52, i=1:9 | dP52_1<br>sort([dP26_1 dP26_2])<br>dP52_3<br>sort([dP26_6 dP26_7])<br>dP52_5<br>sort([dP26_10 dP26_11])<br>dP52_7<br>sort([dP26_15 dP26_16]) | | dP52_2<br>sort([dP26_3 dP26_4])<br>dP52_4<br>sort([dP26_8 dP26_9])<br>dP52_6<br>sort([dP26_12 dP26_13])<br>dP52_8<br>sort([dP26_17 dP26_18]) | | |
| dRU106, i=1:4 | dP106_1<br>sort([dP52_1(1,3) dP52_2(2,4)])<br>dP106_2<br>sort([dP52_3(1,3) dP52_4(2,4)])<br>dP106_3<br>sort([dP52_5(1,3) dP52_6(2,4)])<br>dP106_4<br>sort([dP52_7(1,3) dP52_8(2,4)]) | | | | |
| dRU242, i=1:2 | dP242_1<br>[dP106_1 dP106_2]<br>dP242_2<br>[dP106_3 dP106_4] | | | | |

Relative Pilot Tone Indices and shifts for dRU in 20MHz (start tone index is 1) per RU Size Optimization

| | | | | | | | | | |
|---|---|---|---|---|---|---|---|---|---|
| dRU26, i=1:9 | dP26_1<br>(6,19)+2 | dP26_2<br>(6,19)+7 | dP26_3<br>(6,19)-1 | dP26_4<br>(6,19)+4 | dP26_5<br>(6,19)-3 | | | | |
| | dP26_6<br>(6,19)+6 | dP26_7<br>(6,19)+0 | dP26_8<br>(6,19)+3 | dP26_9<br>(6,19)-5 | | | | | |
| dRU52, i=1:4 | dP52_1<br>sort([dP26_1 dP26_2]) | | dP52_2<br>sort([dP26_3 dP26_4]) | | | | | | |
| | dP52_3<br>sort([dP26_5 dP26_6]) | | dP52_4<br>sort([dP26_7 dP26_8]) | | | | | | |
| dRU106, i=1:2 | dP106_1<br>sort([dP52_1(1,3) dP52_2(2,4)]) | | | | | | | | |
| | dP106_2<br>sort([dP52_3(1,3) dP52_4(2,4)]) | | | | | | | | |

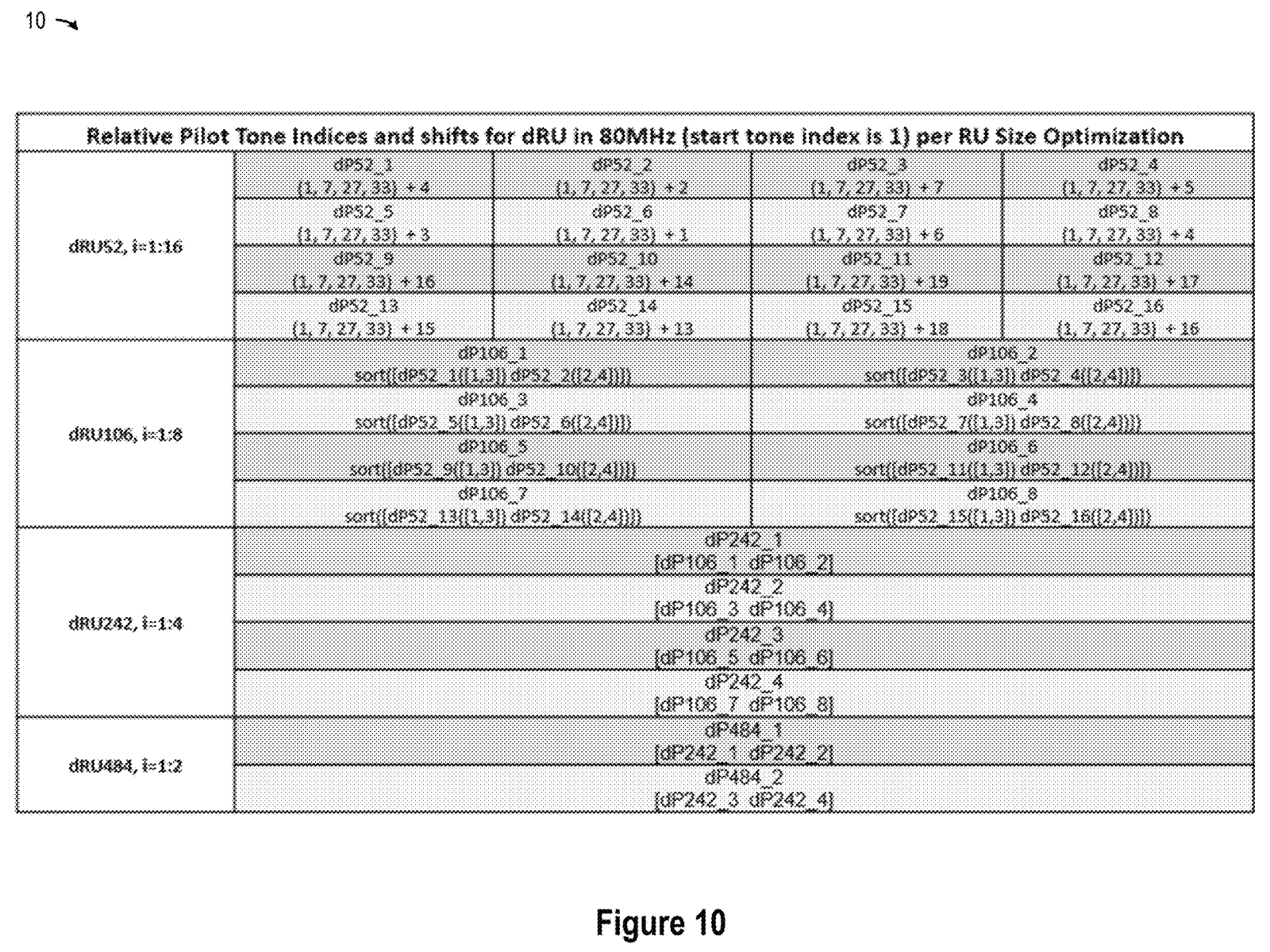

| Relative Pilot Tone Indices and shifts for dRU in 80MHz (start tone index is 1) per RU Size Optimization | | | | |
|---|---|---|---|---|
| dRU52, i=1:16 | dP52_1<br>{1,7,22,33} + 4<br>dP52_5<br>{1,7,22,33} + 3<br>dP52_9<br>{1,7,22,33} + 16<br>dP52_13<br>{1,7,22,33} + 15 | dP52_2<br>{1,7,22,33} + 2<br>dP52_6<br>{1,7,22,33} + 1<br>dP52_10<br>{1,7,22,33} + 14<br>dP52_14<br>{1,7,22,33} + 13 | dP52_3<br>{1,7,22,33} + 7<br>dP52_7<br>{1,7,22,33} + 6<br>dP52_11<br>{1,7,22,33} + 19<br>dP52_15<br>{1,7,22,33} + 18 | dP52_4<br>{1,7,22,33} + 5<br>dP52_8<br>{1,7,22,33} + 4<br>dP52_12<br>{1,7,22,33} + 17<br>dP52_16<br>{1,7,22,33} + 16 |
| dRU106, i=1:8 | dP106_1<br>sort([dP52_1(1,3) dP52_2(2,4)])<br>dP106_3<br>sort([dP52_5(1,3) dP52_6(2,4)])<br>dP106_5<br>sort([dP52_9(1,3) dP52_10(2,4)])<br>dP106_7<br>sort([dP52_13(1,3) dP52_14(2,4)]) | | dP106_2<br>sort([dP52_3(1,3) dP52_4(2,4)])<br>dP106_4<br>sort([dP52_7(1,3) dP52_8(2,4)])<br>dP106_6<br>sort([dP52_11(1,3) dP52_12(2,4)])<br>dP106_8<br>sort([dP52_15(1,3) dP52_16(2,4)]) | |
| dRU242, i=1:4 | dP242_1<br>[dP106_1 dP106_2]<br>dP242_2<br>[dP106_3 dP106_4]<br>dP242_3<br>[dP106_5 dP106_6]<br>dP242_4<br>[dP106_7 dP106_8] | | | |
| dRU484, i=1:2 | dP484_1<br>[dP242_1 dP242_2]<br>dP484_2<br>[dP242_3 dP242_4] | | | |

Figure 10

Relative Pilot Tone Indices and shifts for dRU in 40MHz (start tone index is 1) per RU Size Optimization

| | | | | | |
|---|---|---|---|---|---|
| dRU26, i=1:18 | dP26_1<br>(1,14)+4<br>dP26_6<br>(1,14)+4<br>dP26_10<br>(1,14)+6<br>dP26_15<br>(1,14)+9 | dP26_2<br>(1,14)+3<br>dP26_7<br>(1,14)+6<br>dP26_11<br>(1,14)+8<br>dP26_16<br>(1,14)+11 | dP26_3<br>(1,14)+1<br>dP26_8<br>(1,14)+5<br>dP26_12<br>(1,14)+7<br>dP26_17<br>(1,14)+10 | dP26_4<br>(1,14)+4<br>dP26_9<br>(1,14)+7<br>dP26_13<br>(1,14)+9<br>dP26_18<br>(1,14)+12 | dP26_5<br>(1,14)+2<br>dP26_14<br>(1,14)+0 |
| dRU52, i=1:8 | dP52_1<br>sort({dP26_1 dP26_2})<br>dP52_3<br>sort({dP26_6 dP26_7})<br>dP52_5<br>sort({dP26_10 dP26_11})<br>dP52_7<br>sort({dP26_15 dP26_16}) | | sort({dP26_3 dP26_4})<br>dP52_2<br>sort({dP26_8 dP26_9})<br>dP52_4<br>sort({dP26_12 dP26_13})<br>dP52_6<br>sort({dP26_17 dP26_18})<br>dP52_8 | | |
| dRU106, i=1:4 | dP106_1<br>sort({dP52_1 {1,3} dP52_2 {2,4}})<br>dP106_2<br>sort({dP52_3 {1,3} dP52_4 {2,4}})<br>dP106_3<br>sort({dP52_5 {1,3} dP52_6 {2,4}})<br>dP106_4<br>sort({dP52_7 {1,3} dP52_8 {2,4}}) | | | | |
| dRU242, i=1:2 | dP242_1<br>{dP106_1 dP106_2}<br>dP242_2<br>{dP106_3 dP106_4} | | | | |

Figure 11

| Relative Pilot Tone Indices and shifts for dRU in 20MHz (start tone index is 1) per RU Size Optimization | | | | |
|---|---|---|---|---|
| dP26_1<br>(1,14) + 0<br>dP26_6<br>(1,14) + 4 | dP26_2<br>(1,14) + 2<br>dP26_7<br>(1,14) + 6 | dP26_3<br>(1,14) + 5<br>dP26_8<br>(1,14) + 9 | dP26_4<br>(1,14) + 7<br>dP26_9<br>(1,14) + 11 | dP26_5<br>(1,14) + 12 |
| dP52_1<br>sort([dP26_1 dP26_2])<br>dP52_3<br>sort([dP26_5 dP26_6]) | | dP52_2<br>sort([dP26_3 dP26_4])<br>dP52_4<br>sort([dP26_7 dP26_8]) | | |
| dP106_1<br>sort([dP52_1(1,3)] dP52_2(2,4)])<br>dP106_2<br>sort([dP52_3(1,3)] dP52_4(2,4)]) | | | | | dRU26, i=1:9 dRU52, i=1:4 dRU106, i=1:2

Figure 12

| Pilot Tone Indices and Shifts for 20MHz dRU | | | | | |
|---|---|---|---|---|---|
| | Base pilot tone indices | Cross dRU pilot indices shift | | | |
| dRU26, i=1:9 | dP26 [-11 11 15] | dP26_1 = dP26 [2 15] | dP26_2 = dP26 + 22 [4 17] | dP26_3 = dP26 + 11 [3 16] | dP26_4 = dP26 + 33 [5 18] | dP26_5 = dP26 + 44 [6 20] |
| | | dP26_6 = dP26 + 55 [8 21] | dP26_7 = dP26 + 77 [10 23] | dP26_8 = dP26 + 66 [9 22] | dP26_9 = dP26 + 88 [11 25] | |
| dRU52, i=1:4 | dP52 [-111 -89 15 37] | dP52_1 = dP52 sort([dP26_1 dP26_2]) | | dP52_2 = dP52 + 11 ([dP26_3 dP26_4]) | |
| | | dP52_3 = dP52 + 55 sort([dP26_6 dP26_7]) | | dP52_4 = dP52 + 66 ([dP26_8 dP26_9]) | |
| dRU106, i=1:2 | dP106 [-111 -79 15 49] | dP106_1 = dP106 ([dP52_1[1 3] dP52_2[2 4]]) | | dP106_2 = dP106 + 55 ([dP52_3[1 3] dP52_3[2 4]]) | |

| dRU size | Pilot indices for 20MHz dRU transmission $K=1$ |
|---|---|
| dRU26, i = 1:6 | {111 15},{-89 37},{100 26},{-78 48},{-67 59}, -56 70},{-34 92},{-45 81},{-23 103} |
| dRU52, i = 1:4 | {111 -89 15 37},{-100 -78 26 48}, -56 -34 70 92},{-45 -23 81 103} |
| dRU106, i = 1:2 | {111 -78 15 48},{-56 -23 70 103} |

16B

| dRU size | Pilot indices for 40MHz dRU transmission $K=1$ |
|---|---|
| dRU26, i = 1:18 | {224 28},{-125 127},{-202 50},{-103 149}, {-81 171}, {114 138},{213 39},{-92 160},{-191 61}, {169 83},{-70 182},{-147 105},{-48 204}, {180 72} |
| dRU52, i = 1:8 | {-59 193},{-158 94},{-37 215},{-136 116}, {224 -125 28 127},{-202 -109 50 149}, {213 -114 39 138},{191 -92 61 160}, {169 -70 83 182},{-147 -49 105 204}, {158 -58 94 193},{-136 -37 116 215} |
| dRU106, i = 1:4 | {224 -103 28 149},{-49 83 204},{213 -92 39 160}, {169 -158 -49 -37 83 94 204 215} |
| dRU242, i = 1:2 | {-224 -213 -103 -92 28 39 149 160}, {169 -158 -49 -37 83 94 204 215} |

16C

| dRU size | Pilot indices for 80MHz dRU transmission $K=1$ |
|---|---|
| dRU52, i = 1:16 | {-267 -87 233 413}, {-223 -43 277 457}, {-335 -155 165 345}, {-291 -111 209 389}, {-369 -189 131 311}, {-325 -145 175 355}, {-301 -121 199 379}, {-257 -77 243 423}, {-358 -178 142 322}, {-314 -134 186 366}, {-426 -246 74 254}, {-382 -202 118 298}, {-460 -280 40 220}, {-416 -236 84 264}, {-392 -212 108 288}, {-348 -168 152 332} |
| dRU106, i = 1:8 | {-267 -43 233 457}, {-335 -111 165 389}, {-369 -145 131 355}, {-301 -77 199 423}, {-358 -134 142 366}, {-426 -202 74 298}, {-460 -236 40 264}, {-392 -168 108 332} |
| dRU242, i = 1:4 | {-335 -267 -111 -43 165 233 389 457}, {-369 -301 -145 -77 131 199 355 423}, {-426 -358 -202 -134 74 142 298 366}, {-460 -392 -236 -168 40 108 264 332} |
| dRU484, i = 1:2 | {-369 -335 -301 -267 -189 -155 -121 -87 131 165 199 233 311 345 379 413}, {-460 -426 -392 -358 -280 -246 -212 -178 40 74 108 142 220 254 288 322} |

PILOT DESIGN FOR DISTRIBUTED RESOURCE UNITS

CROSS-REFERENCE TO RELATED APPLICATION AND PRIORITY CLAIM

This application claims the benefit of U.S. Provisional Patent Application No. 63/211,358 entitled "Pilot Design For Distributed RU" filed Jun. 16, 2021; U.S. Provisional Patent Application No. 63/224,145 entitled "A Method For Subcarrier And Resource Allocation In Wireless Local Area Networks" filed Jul. 21, 2021; U.S. Provisional Patent Application No. 63/261,386 entitled "Pilot Design for Distributed RU" filed Sep. 20, 2021; and U.S. Provisional Patent Application No. 63/262,473 entitled "Pilot Design for Distributed RU" filed Oct. 13, 2021, each of which is incorporated by reference in its entirety as if fully set forth herein.

BACKGROUND

Field

The present disclosure is directed in general to communication networks. In one aspect, the present disclosure relates generally to wireless local area network (WLAN) implementing the Institute of Electrical and Electronics Engineers (IEEE) 802.11 standard and any other standards and/or networks that can provide wireless transfer of data.

Description of the Related Art

An ever-increasing number of relatively inexpensive, low power wireless data communication services, networks and devices have been made available over the past number of years, promising near wire speed transmission and reliability. Enabling technology advances in the area of wireless communications, various wireless technology standards (including for example, the IEEE Standards 802.11a/b/g, 802.11n, 802.11ac and 802.11ax and their updates and amendments, as well as the IEEE Standard 802.11be now in the process of being developed) have been introduced that are known to persons skilled in the art and are collectively incorporated by reference as if set forth fully herein fully. For example, recent proposals for the latest 802.11be standard provide higher data rates and improved transmission efficiencies between wireless devices by, inter alia, adding multiple-RU (resource unit) support for client stations and increasing the modulating order, the signaling bandwidth, and the number of spatial streams. In addition, recent wireless standard proposals enable wireless devices, such as Access Point (AP) multi-link devices (MLDs) or non-AP MLDs (e.g., station (STA) multi-link devices (STA MLDs)) to execute various multi-link operations, such as transmission and reception of frames via one or more communication links. As an example, a wireless AP MLD may transmit and receive Physical Layer Protocol Data Units (PPDUs) with a wireless non-AP MLD on multiple links to exchange information and transmit data. However, when a PPDU is transmitted in accordance with a power spectrum density (PSD) limit, the PPDU may be subject to a restricted transmission range and/or a restricted data rate, resulting in inefficient wireless communication performance with existing solutions for providing wireless data communication services.

BRIEF DESCRIPTION OF THE DRAWINGS

The present invention may be understood, and its numerous objects, features and advantages obtained, when the following detailed description of a preferred embodiment is considered in conjunction with the following drawings.

FIG. 7 illustrates a first example pilot tone design plan with a table listing of relative pilot tone indices and shifts for different RUs distributed over a signal bandwidth of 80 MHz in accordance with selected embodiments of the present disclosure.

FIG. 8 illustrates a second example pilot tone design plan with a table listing of relative pilot tone indices and shifts for different RUs distributed over a signal bandwidth of 40 MHz in accordance with selected embodiments of the present disclosure.

FIG. 9 illustrates a third example pilot tone design plan with a table listing of relative pilot tone indices and shifts for different RUs distributed over a signal bandwidth of 20 MHz in accordance with selected embodiments of the present disclosure.

FIG. 10 illustrates a fourth example pilot tone design plan with a table listing of relative pilot tone indices and shifts for different RUs distributed over a signal bandwidth of 80 MHz in accordance with selected embodiments of the present disclosure.

FIG. 11 illustrates a fifth example pilot tone design plan with a table listing of relative pilot tone indices and shifts for different RUs distributed over a signal bandwidth of 40 MHz in accordance with selected embodiments of the present disclosure.

FIG. 12 illustrates a sixth example pilot tone design plan with a table listing of relative pilot tone indices and shifts for different RUs distributed over a signal bandwidth of 20 MHz in accordance with selected embodiments of the present disclosure.

FIG. 13 illustrates a seventh example pilot tone design plan which shifts pilot tone locations across different RUs to provide a minimum specified pilot tone spacing by depicting a table of relative pilot tone indices and shifts for different RUs distributed over a signal bandwidth of 20 MHz in accordance with selected embodiments of the present disclosure.

FIG. 14 illustrates an eighth example pilot tone design plan which shifts pilot tone locations across different RUs to provide a minimum specified pilot tone spacing by depicting a table of relative pilot tone indices and shifts for different RUs distributed over a signal bandwidth of 40 MHz in accordance with selected embodiments of the present disclosure.

FIG. 15 illustrates a ninth example pilot tone design plan which shifts pilot tone locations across different RUs to provide a minimum specified pilot tone spacing by depicting a table of relative pilot tone indices and shifts for different RUs distributed over a signal bandwidth of 80 MHz in accordance with selected embodiments of the present disclosure.

FIG. 16 illustrates another example pilot tone design plan which shifts pilot tone locations across different RUs to provide a minimum specified pilot tone spacing by depicting a set of tables of relative pilot tone indices for different RUs distributed over signal bandwidths of 20 MHz, 40 MHz, and 80 MHz in accordance with selected embodiments of the present disclosure.

FIG. 17 illustrates another example pilot tone design plan which shifts pilot tone locations across different RUs to provide a minimum specified pilot tone spacing by depicting a table of relative pilot tone indices for different RUs distributed over a signal bandwidth of 80 MHz in accordance with selected embodiments of the present disclosure.

DETAILED DESCRIPTION

Figure 1:
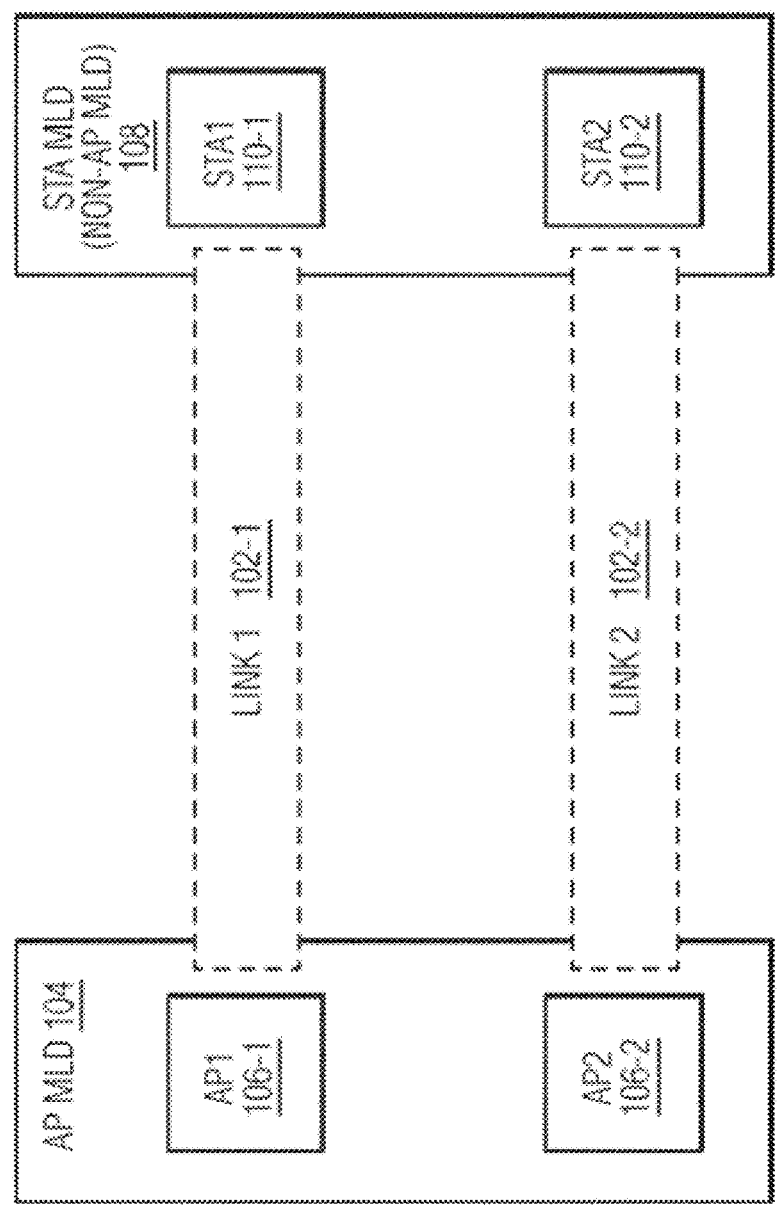
FIG. 1 is a block diagram of a multi-link communications system in accordance with selected embodiments of the present disclosure.

A system, apparatus, and methodology are described for enabling wireless communication station (STA) devices to generate a Physical Layer Protocol Data Unit (PPDU) in which data and/or pilot tones of a resource unit (RU) are distributed onto a disjoint set of subcarriers included in a larger signal bandwidth using a defined data/pilot tone mapping plan, and transmitting the PPDU using the disjoint set of subcarriers, thereby accommodating transmission of wider bandwidth and multiple resource unit assignments in accordance with power spectrum density (PSD) limits provided for orthogonal frequency-division multiplexing (OFDM) modulated symbols supported by emerging 802.11 standards, such as 802.11be. As disclosed herein, the data/pilot tone mapping plan distributes a plurality of logical RUs over a spreading frequency block such that data and pilot tones from each logical RU are distributed across the spreading frequency block, thereby forming a distributed RU (dRU). In selected embodiments, the pilot tones for each dRU size keep the same logical index position relative to a starting tone index of each logical RU, resulting in contiguous pilot tone sequences corresponding to the logical RU sequence. In other embodiments, the pilot tone indices for each dRU size are computed as travelling or shifting pilot tone indices relative to a starting tone index of each logical RU, where the amount of shift for each dRU can be implemented by computing a pilot logical index shift value. In other embodiments, a table of pilot tone index values for each dRU size are chosen or designed for all dRUs within each spreading frequency block such that every dRU of a given size has the same number of pilot tones which are quasi-evenly distributed across the spreading frequency block, such as by using the travelling or shifting pilot tone indices.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

In embodiments of a wireless communications system, an access point (AP) affiliated with an AP multi-link device (MLD) (e.g., wireless device) of a wireless local area network (WLAN) transmits data to at least one associated non-AP station (STA) affiliated with a non-AP STA MLD (e.g., a STA MLD). The AP MLD is configured to operate with associated non-AP MLDs according to a communication protocol. For example, the communication protocol may be an Extremely High Throughput (EHT) communication protocol, or Institute of Electrical and Electronics Engineers (IEEE) 802.11be communication protocol, or future versions of such protocols that are being developed. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., IEEE 802.11n, IEEE 802.11ac, IEEE 802.11ax, etc.) may be collectively referred to herein as "legacy" communication protocols.

Referring now to FIG. 1, there is depicted a multi-link communications system 1 that is used for wireless (e.g., WiFi) communications. As depicted, the multi-link communications system 1 includes one AP multi-link device, which is implemented as AP MLD 104, and one non-AP STA multi-link device, which is implemented as STA MLD 108. The multi-link communications system 1 can be used in various applications, such as industrial applications, medical applications, computer applications, and/or consumer or enterprise applications. In some embodiments, the multi-link communications system 1 is a wireless communications system, such as a wireless communications system compatible with an IEEE 802.11 protocol. For example, the multi-link communications system 1 may be a wireless communications system compatible with the IEEE 802.11be protocol. Although the depicted multi-link communications system 1 is shown with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown as being connected in a certain topology, the network topology of the multi-link communications system is not limited to the depicted topology. Although the system described with reference to FIG. 1 involves multi-link communications, the techniques described herein are also applicable to single-link communications.

In the embodiment depicted in FIG. 1, the AP MLD 104 includes two radios, implemented as access points (APs) 106-1 and 106-2. In such an embodiment, the APs may be AP1 106-1 and AP2 106-2. In some embodiments, the AP MLD 104 implements upper layer Media Access Control (MAC) functionalities (e.g., block acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different size BSS operating channel. For example, AP1 106-1 may operate in a 320 MHz BSS operating channel and AP2 106-2 may operate in a 160 MHz BSS operating channel. Although the AP MLD 104 is shown as including two APs, other embodiments of the AP MLD 104 may include more than two APs.

As depicted, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connects to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in a frequency band less than 6 GHz (e.g., 2.4 GHz or 5 GHz) and the non-AP STA 110-2 may operate in frequency band of 6 GHz. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In selected embodiments, the STA MLD 108 communicates with the AP MLD 104 via two communication links, e.g., link 1 102-1 and link 2 102-2. For example, each of the non-AP STAs 110-1 or 110-2 communicates with an AP 106-1 or 106-2 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames (e.g., Physical Layer Protocol Data Units (PPDUs), Beacons, management frames, etc.) between a first wireless device (e.g., an AP) and a second wireless device (e.g., a non-AP STA). In some embodiments, a 20 MHz channel may be a punctured 20 MHz channel or an unpunctured 20 MHz channel. In some embodiments, the 20 MHz channels may be aggregated to form a segment (e.g., an 80 MHz segment or a 160 MHz segment). Although the STA MLD 108 is shown as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via one link or more than two communication links.

In selected embodiments, wireless devices (e.g., APs or non-AP STAs) operating according to at least one legacy communication protocol may operate in a frequency band of less than 6 GHz. In some embodiments, frequency bands utilized in a less than 6 GHz range may include, for example, Unlicensed National Information Infrastructure (U-NII)-1, U-NII-2A, U-NII-2B, U-NII-2C, U-NII-3, U-NII-4, or U-NII-5. For wireless devices operating in frequency bands less than 6 GHz, there may be no power spectrum density (PSD) limit for wireless transmissions or the PSD limit may be higher than a practical PSD of a packet that a STA can transmit. Instead, for wireless devices operating in frequency bands less than 6 GHz, there may be a per-STA Equivalent Isotopically Radiated Power (EIRP) limit. Thus, to extend transmission range in frequency bands less than 6 GHz, wireless devices (e.g., APs or non-AP STAs) operating according to at least one legacy communication protocol may, for example, reduce transmission bandwidth of a PPDU to increase per-subcarrier power.

However, in some embodiments, wireless devices (e.g., APs or non-AP STAs) operating according to at least one non-legacy communication protocol (e.g., the EHT communication protocol) may operate in a frequency band of 6 GHz. In some embodiments, frequency bands utilized within a 6 GHz range may include, for example, U-NII-5, U-NII-6, U-NII-7, or U-NII-8. In an embodiment, a low power indoor (LPI) transmission mode that may be in accordance with, for example, Federal Communications Commission (FCC) regulations, may be defined for transmissions in the frequency band of 6 GHz. In some embodiments, the LPI transmission mode may include a PSD limit for wireless devices (e.g., APs or non-AP STAs) transmitting PPDUs in the 6 GHz frequency band. For example, when a PPDU is transmitted in a frequency band of 6 GHz, the PSD may be limited to 5 dBm per 1 MHz for an AP and −1 dBm per 1 MHz for a non-AP STA. In such an example, wireless devices (e.g., APs or non-AP STAs) operating according to at least one non-legacy communication protocol (e.g., the EHT communication protocol) may have to increase PPDU bandwidth to allow for greater transmission power and extended transmission range in Orthogonal Frequency-Division Multiple Access (OFDMA) transmissions. As a result, different communication techniques that can extend the transmission range of a PPDU transmitted in accordance with a PSD limit in OFDMA extended transmissions may be desirable.

In accordance with selected embodiments of the present disclosure, a technique for wireless communications may involve generating a PPDU that includes a resource unit (RU), wherein a size of the RU is less than a signal bandwidth. However, when generating the PPDU, data and pilot tones corresponding to the RU are distributed onto a disjoint set of subcarriers included in a frequency unit by using a defined data/pilot tone mapping plan which distributes a plurality of logical RUs over a spreading frequency block such that data and pilot tones from each logical RU are distributed across the spreading frequency block, thereby forming a distributed RU (dRU). In this way, the PPDU may be transmitted using the disjoint set of subcarriers in accordance with a PSD limit. Thus, techniques described herein may enable wireless devices to increase the power of PPDUs transmitted in PSD limited transmissions. Increasing the power of PPDUs transmitted in PSD limited transmissions may allow wireless devices to achieve longer range transmission in frequency bands with a PSD limit and may further enable wireless communications to be performed more efficiently.

Functional block diagrams of techniques for generating a PPDU where data corresponding to an RU is distributed onto a disjoint set of subcarriers are described in further detail below with reference to FIGS. 2A-D

Figure 2A:
FIG. 2A is a functional block diagram of a technique for generating a Physical Layer Protocol Data Unit (PPDU), such that data and pilot tones corresponding to a Resource Unit (RU) may be distributed onto a disjoint set of subcarriers in accordance with selected embodiments of the present disclosure.

Referring first to FIG. 2A, there is depicted is a functional block diagram 2A of a technique for generating a PPDU (not shown), such that data corresponding to an RU may be distributed onto a disjoint set of subcarriers. As depicted, the functional block diagram 2A includes a Low-Density Parity-Check (LDPC) encoder 202 (e.g., a forward error correction encoder) that encodes scrambled information bits to generate encoded data for the PPDU. In an embodiment, the functional block diagram 2A also includes a stream parser 204 that receives and parses the encoded data into one or more spatial streams. In such an embodiment, a modulator 206 then modulates the parsed bit streams to generate the modulated signal to be transmitted on the data and pilot tones corresponding to an RU in the PPDU.

In addition, a distributed RU (dRU) tone mapper 208 may receive the modulated signal, and then map or distribute the modulated signal onto a disjoint set of data/pilot subcarriers within an spreading bandwidth that corresponding to the RU in the signal bandwidth. As described herein, the signal bandwidth may refer to a transmission bandwidth of a PPDU (e.g., PPDU bandwidth). Examples of the signal bandwidth may include 20 MHz, 40 MHz, 80 MHz, 160 MHz, 320 MHz, or more than 320 MHz. In an embodiment, a spatial mapper 212 maps the disjoint set of subcarriers onto at least one transmission chain for an inverse fast Fourier transformer, implemented as IFFT 214. At the IFFT 214, bits of a corresponding transmission chain undergo inverse fast Fourier transform (IFFT) in generating the PPDU. In some embodiments, the PPDU generated by the functional block diagram 2A may be a PPDU for OFDMA transmissions and/or an EHT PPDU that may be transmitted by a wireless device in accordance with a PSD limit.

Figure 2B:
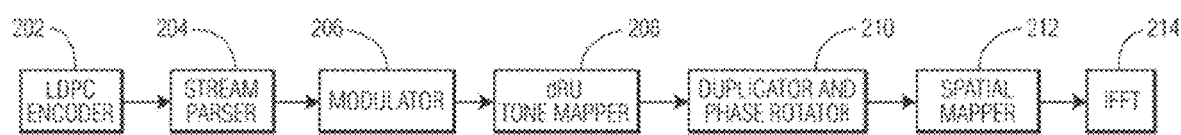
FIG. 2B is another functional block diagram of a technique for generating a PPDU, such that data and pilot tones corresponding to an RU may be distributed onto a disjoint set of subcarriers in accordance with selected embodiments of the present disclosure.

Referring now to FIG. 2B, there is depicted a functional block diagram 2B of a technique for generating a PPDU (not shown), such that data corresponding to an RU may be distributed onto a disjoint set of subcarriers. As depicted, the functional block diagram 2B includes an LDPC encoder 202 (e.g., a forward error correction encoder) that encodes scrambled information bits to generate encoded data for the PPDU. The depicted functional block diagram 2B also includes a stream parser 204 that receives and parses the encoded data into one or more spatial streams. In addition, a modulator 206 then modulates the parsed data to generate the modulated signal corresponding to an RU to be transmitted on the data and pilot tones in the PPDU. In an embodiment, a dRU tone mapper 208 may receive the modulated data and pilot tones, and then map or distribute (using a frequency unit) the modulated signal onto a disjoint set of data/pilot subcarriers included in a frequency unit that corresponding to the RU. Examples of the frequency unit may include 20 MHz, 40 MHz, or 80 MHz. The depicted functional block diagram 2B also includes a duplicator and phase rotator 210 which is connected to receive the modulated data corresponding to the RU and perform duplication and/or phase rotation of the frequency unit across a signal bandwidth of the PPDU. Examples of the signal bandwidth may include 20 MHz, 40 MHz, 80 MHz, 160 MHz, 320 MHz, or more than 320 MHz. In some embodiments, "duplicated" may imply that the contents (e.g., data, information, bits, etc.) of each field for a 20 MHz channel of the PPDU are duplicated across the signal bandwidth and/or are the same for each corresponding field in other 20 MHz channels of the PPDU. In some embodiments, a "phase rotation" may imply that a number of phase rotation parameters may be applied to subcarriers (sometimes referred to herein as "tones") included in the signal bandwidth. In some embodiments, the modulated data corresponding to the RU may be duplicated and/or undergo phase rotation for each frequency unit of the signal bandwidth (e.g., four 80 MHz frequency units of a 320 MHz signal bandwidth). In an embodiment, after the data corresponding to the RU undergoes duplication and/or phase rotation, a spatial mapper 212 maps the disjoint set of subcarriers onto at least one transmission chain for an inverse fast Fourier transformer, implemented as IFFT 214. At the IFFT 214, bits of a corresponding transmission chain undergo IFFT in generating the PPDU. In selected embodiments, the PPDU generated by the functional block diagram 2B may be a PPDU for OFDMA transmissions and/or an EHT PPDU that may be transmitted by a wireless device in accordance with a PSD limit.

Figure 2C:
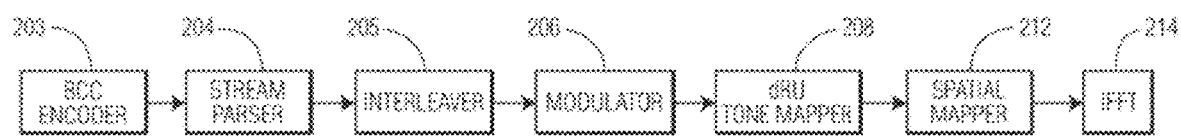
FIG. 2C is another functional block diagram of a technique for generating a PPDU, such that data and pilot tones corresponding to an RU may be distributed onto a disjoint set of subcarriers in accordance with selected embodiments of the present disclosure.

Referring now to FIG. 2C, there is depicted a functional block diagram 2C of a technique for generating a PPDU, such that data corresponding to an RU may be distributed onto a disjoint set of subcarriers. As depicted, the functional block diagram 2C includes a binary convolutional code (BCC) encoder 203 (e.g., a forward error correction encoder) that encodes scrambled information bits to generate encoded data for the PPDU. In another embodiment, the BCC encoder 203 includes a binary convolutional encoder followed by a puncturing block. In addition, the functional block diagram 2C includes a stream parser 204 that receives and parses the encoded data into one or more spatial streams. In addition, an interleaver 205 receives the parsed data of the one or more spatial streams and interleaves the data of the corresponding spatial streams. In addition, a modulator 206 then modulates the interleaved data to generate the modulated signal to be transmitted on the data and pilot tones corresponding to an RU in the PPDU. In addition, a dRU tone mapper 208 may receive the modulated signal, and then map or distribute (using an encoding bandwidth) the modulated signal onto a disjoint set of data/pilot subcarriers included in a frequency unit of a signal bandwidth that corresponds to the RU. Examples of the signal bandwidth may include 20 MHz, 40 MHz, 80 MHz, 160 MHz, 320 MHz, or more than 320 MHz. In addition, a spatial mapper 212 maps the disjoint set of subcarriers onto at least one transmission chain for an inverse fast Fourier transformer, implemented as IFFT 214. At the IFFT 214, bits of a corresponding transmission chain undergo IFFT in generating the PPDU. In selected embodiments, the PPDU generated by the functional block diagram 2C may be a PPDU for OFDMA transmissions and/or an EHT PPDU that may be transmitted by a wireless device in accordance with a PSD limit.

Figure 2D:
FIG. 2D is another functional block diagram of a technique for generating a PPDU, such that data and pilot tones corresponding to an RU may be distributed onto a disjoint set of subcarriers in accordance with selected embodiments of the present disclosure.

Referring now to FIG. 2D, there is depicted a functional block diagram 2D of a technique for generating a PPDU, such that data corresponding to an RU may be distributed onto a disjoint set of subcarriers. As depicted, the functional block diagram 2D includes a BCC encoder 203 (e.g., a forward error correction encoder) that encodes scrambled information bits to generate encoded data for the PPDU. In another embodiment, the BCC encoder 203 includes a binary convolutional encoder followed by a puncturing block. In addition, the functional block diagram 2D includes a stream parser 204 that receives and parses the encoded data into one or more spatial streams. In addition, an interleaver 205 receives the parsed data of the one or more spatial streams and interleaves the data of the corresponding spatial streams. In addition, a modulator 206 then modulates the interleaved data to generate a modulated signal to be transmitted on the data and pilot tones corresponding to an RU in the PPDU. In addition, a dRU tone mapper 208 may receive the modulated signal, and then map or distribute (using a frequency unit) the modulated signal onto a disjoint set of subcarriers included in a frequency unit that corresponds to the RU. Examples of the frequency unit may include 20 MHz, 40 MHz, or 80 MHz. In addition, a duplicator and phase rotator 210 may receive the modulated data/pilot tones corresponding to the RU and perform duplication and/or phase rotation of the frequency unit across a signal bandwidth of the PPDU. Examples of the signal bandwidth may include 20 MHz, 40 MHz, 80 MHz, 160 MHz, 320 MHz, or more than 320 MHz. In selected embodiments, "duplicated" may imply that the contents (e.g., data, information, bits, etc.) of each field for a 20 MHz channel of the PPDU are duplicated across the signal bandwidth and/or are the same for each corresponding field in other 20 MHz channels of the PPDU. In some embodiments, a "phase rotation" may imply that a number of phase rotation parameters may be applied to subcarriers (sometimes referred to herein as "tones") included in the signal bandwidth. In some embodiments, the modulated data corresponding to the RU may be duplicated and/or undergo phase rotation for each frequency unit of the signal bandwidth (e.g., four 80 MHz frequency units of a 320 MHz signal bandwidth). In an embodiment, after the data corresponding to the RU undergoes duplication and/or phase rotation, a spatial mapper 212 maps the disjoint set of subcarriers onto at least one transmission chain for an inverse fast Fourier transformer, implemented as IFFT 214. At the IFFT 214, bits of a corresponding transmission chain undergo IFFT in generating the PPDU. In selected embodiments, the PPDU generated by the functional block diagram 2D may be a PPDU for OFDMA transmissions and/or an EHT PPDU that may be transmitted by a wireless device in accordance with a PSD limit.

Figure 3:
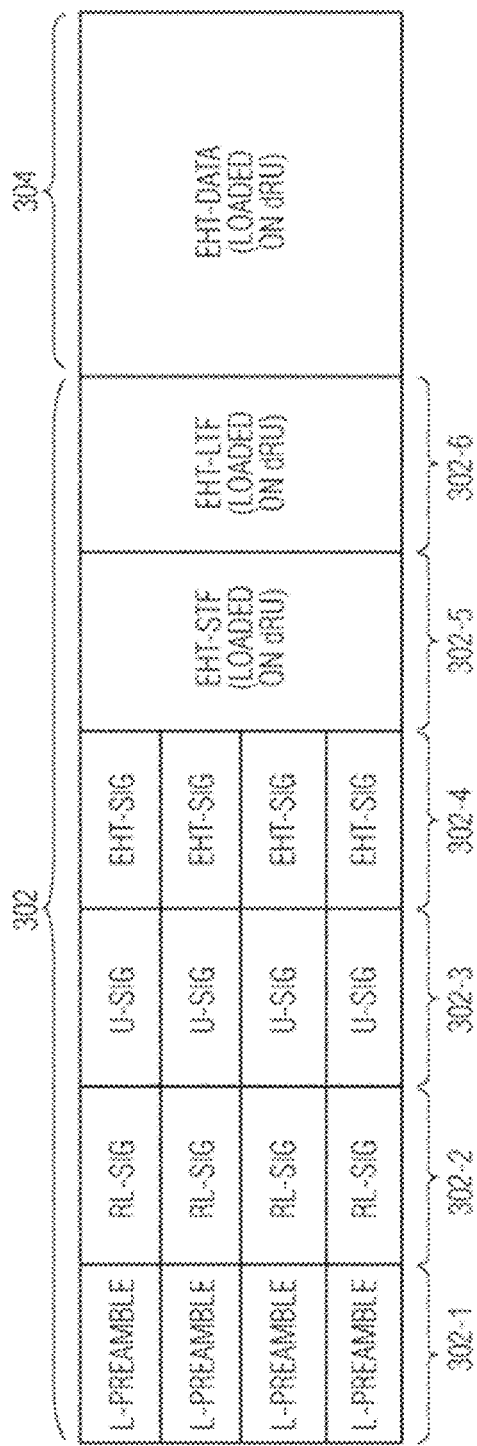
FIG. 3 depicts an example of a PPDU that may be transmitted by a wireless device using an orthogonal frequency-division multiple access (OFDMA) modulation scheme in accordance with selected embodiments of the present disclosure.

Turning now to FIG. 3, there is depicted an example of a PPDU 3 that may be transmitted by a wireless device in accordance with a PSD limit. In selected embodiments, the PPDU 3 may be a PPDU for OFDMA transmissions and/or an EHT PPDU generated using the functional block diagram shown in FIGS. 2A-2D, such that the PPDU may be transmitted or solicited using OFDMA. In some embodiments, the PPDU 3 may be a non-trigger-based PPDU. In some embodiments, the PPDU 3 may include an RU (not shown) that is less than a signal bandwidth, such that data and pilot tones corresponding to the RU may be distributed onto a disjoint set of subcarriers (not shown) included in a frequency unit. In particular, FIG. 3 depicts a 20 MHz preamble portion 302 and a data portion 304 that are each included in the PPDU 3. In the PPDU 3, each row included in the 20 MHz preamble portion 302 may represent a 20 MHz channel of a signal bandwidth, such that the signal bandwidth may be, for example, 40 MHz, 80 MHz, 160 MHz, 320 MHz, or more than 320 MHz.

In an embodiment, the 20 MHz preamble portion 302 of the PPDU 3 includes four fields that are duplicated for each 20 MHz channel of the signal bandwidth and two fields that may be loaded onto a dRU. As an example, a dRU may be defined as a set of distributed subcarriers within a certain frequency unit, such that data corresponding to the dRU may be encoded and modulated as one RU. The six fields of the 20 MHz preamble portion 302 are implemented as a first field 302-1 (shown as including Legacy-Preamble field (L-Preamble)), a second field 302-2 (shown as including Repeated Legacy Signal field (RL-SIG)), a third field 302-3 (shown as including Universal Signal field (U-SIG)), a fourth field 302-4 (shown as including EHT Signal field (EHT-SIG)), a fifth field 302-5 (shown as including EHT-Short Training field (EHT-STF)) that may be loaded onto a dRU, and a sixth field 302-6 (shown as including EHT-Long Training field (EHT-LTF)) that may be loaded onto a dRU. In some embodiments, "duplicated" may imply that the contents (e.g., data, information, bits, etc.) of each field for a 20 MHz channel are duplicated across the signal bandwidth and/or are the same for each corresponding field in other 20 MHz channels of the PPDU. For example, the contents of the first field 302-1 (shown as L-Preamble) in a first 20 MHz channel (shown by the first row) of the PPDU 300-2 may be repeated and/or the same as the contents of the first field in a second 20 MHz channel (shown by the second row), a third 20 MHz channel (shown by the third row), a fourth 20 MHz channel (shown by the fourth row), and/or other 20 MHz channels (not shown) included in the signal bandwidth of the PPDU.

As depicted, the data portion 304 of the PPDU 300-1 may include EHT data (EHT-DATA) that may be loaded onto a dRU. In such an embodiment, the data portion 304 may be encoded using an encoding bandwidth. For example, the data portion 304 of the PPDU 3 may be encoded using an 80 MHz encoding bandwidth. In addition, the data portion 304 may involve distributing data and pilot tones corresponding to the RU onto the disjoint set of subcarriers across the signal bandwidth. For example, the data portion 304 of the PPDU 3 may distribute data/pilot tones corresponding to the RU onto the disjoint set of subcarriers across a signal bandwidth of 80 MHz, 160 MHz, 320 MHz, or more than 320 MHz.

In other embodiments (not shown), the encoding bandwidth may be 40 MHz and the signal bandwidth may be at least 80 MHz. In such embodiments, when the data portion 304 is encoded using an encoding bandwidth of 40 MHz, each 40 MHz segment may be duplicated (e.g., a 40 MHz segment is duplicated to become two 40 MHz segments) and implemented as an 80 MHz segment. For example, a 320 MHz signal bandwidth may include four 80 MHz segments when encoded using a 40 MHz encoding bandwidth. As another example, when encoding is performed using a 40 MHz encoding bandwidth, a 160 MHz signal bandwidth may include two 80 MHz segments and an 80 MHz signal bandwidth may include one 80 MHz segment. In addition, in some embodiments, the data portion 304 may be modulated by the modulator 206 shown in FIG. 2A or FIG. 2C. In some embodiments, distribution of the data corresponding to the RU onto the disjoint set of subcarriers included in the data portion 304 may be performed via the dRU tone mapper 208 shown in FIG. 2A or FIG. 2C.

As disclosed herein, the data portion 304 may include the payload that occupies the data symbol with nine 26-subcarrier RUs. In an embodiment, the payload occupies the data symbol of the PPDU with RUs for corresponding users in a dispersed RU transmission. As an example, a dispersed RU transmission may involve the transmission of a PPDU in which data tones corresponding to an RU have been distributed onto a disjoint set of subcarriers. In an embodiment, the payload may be generated for a 26-subcarrier RU, such that the first symbol may be loaded onto the first 26-subcarrier RU, while the second symbol is loaded onto the second 26-subcarrier RU, and so on in a round robin manner so that the 10th symbol is loaded onto the first 26-subcarrier RU. Such an RU may be referred to as a dispersed RU. By spreading the RU across different symbols, an average spectrum similar to that of entire loaded 20 MHz may be achieved and power boosted performance may be similar to that of loading a single RU. In similar fashion, the pilots may be loaded in a pilot location of the corresponding 26-subcarrier RU. Alternatively, the entire 20 MHz signal bandwidth may be used for transmission to a single user, such that the pilots may be loaded in symbols, resulting in additional gain in performance. For example, doubling the pilots from 4 to 8 results in a performance improvement of approximately 1 dB gain (i.e., considering 20 MHz and 26-subcarrier RU).

In some embodiments, initial bandwidth may be a full signal bandwidth, a multi-RU (MRU) portion in an OFDMA transmission, or the like. Further, initial RU sizes may be a 26-subcarrier RU or a size other than the 26-subcarrier RU, e.g., 52/106/52+26/106+26/242/484/484+242/996. In an embodiment, 52+26 may be any adjacent 52+26 for simplicity. In another embodiment, a fixed sequence may be used, i.e., a predefined 52+26 sized RU in each data symbol. In an embodiment, RUs across symbols may not need to be the same size. In an embodiment, a 242 RU assignment may be across a signal bandwidth greater than 20 MHz, such that assignment may be similar for other larger sized RUs. Further, instead of changing the RU location every symbol, RU location may be changed across multiple symbols. In an embodiment, the RUs may be mapped to the existing RU tone map as defined by the 802.11be communication protocol tone plan.

In some embodiments, a new tone plan may be utilized. In an embodiment, placement of a small RU in a symbol may lead to a burst error if a particular portion of the bandwidth is in deep fade. Instead, the RU subcarriers within a symbol may be dispersed, such that a 242 sized RU may be divided into sub-RUs (e.g., nine 26 RUs where subcarriers in sub-RUs are adjacent). In an embodiment, symbols may be generated with a 26-subcarrier RU and the subcarriers may be spread across the entire bandwidth, i.e., a first symbol may have loaded subcarriers on a first data tone, a tenth data tone, a nineteenth data tone and so on. Similarly, symbol x may have loaded tones on a (mod(x-1, 9)+1)th data tone (i.e., S1 data tone), a (S1+9) data tone, and so on. Further, the RU size and bandwidth may not be limited to the 26-subcarrier RU and 20 MHz (242 sized RU) bandwidth portion, and RU location may change across multiple symbols.

In an embodiment, considerable performance gain may be achieved in an EHT portion of a PPDU. To improve preamble performance, the 802.11ax communication protocol-based ER preamble structure may be used. Further, power boost may be applied to the entire preamble portion to achieve greater performance benefits. In addition, the entire preamble may be duplicated across a 20 MHz portion, such that there may be preamble repetition. In an embodiment, this mode may be used for signal bandwidths greater than 20 MHz, and the RU shifting may be across the entire bandwidth. In such an embodiment, EHT-LTF may be available on all data tones, and may be power boosted to obtain a channel estimate performance gain. Further, EHT-LTF may be repeated to achieve noise reduction by averaging.

Figure 4:
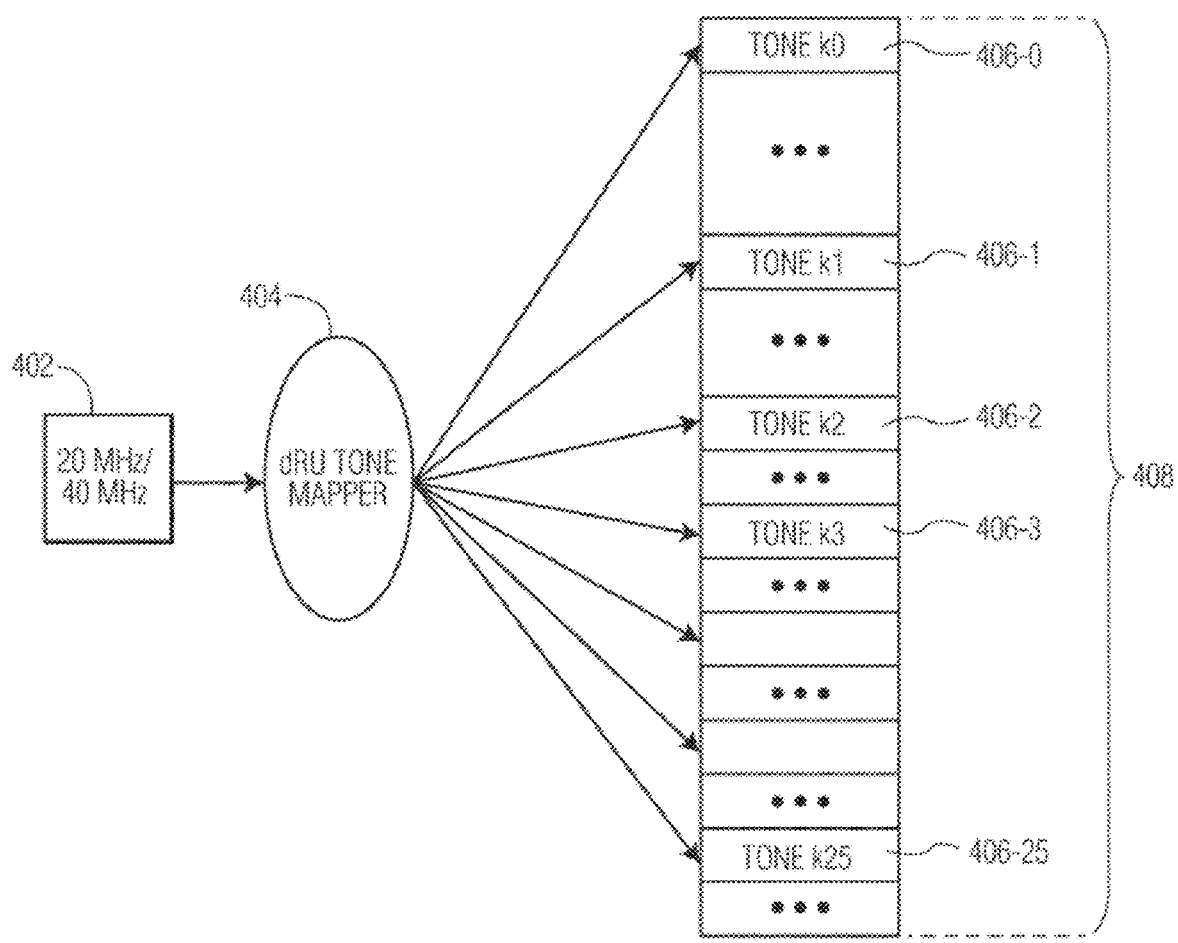
FIG. 4 illustrates an RU encoding system wherein a dRU tone mapper encodes a data portion of a PPDU into a disjoint set of subcarriers that may be transmitted by a wireless device to comply with a PSD limit for non-OFDMA transmissions in accordance with selected embodiments of the present disclosure.

Referring now to FIG. 4, there is shown an RU encoding system 4 wherein a dRU tone mapper 404 encodes a data portion of a PPDU into a disjoint set of subcarriers that may be transmitted by a wireless device in accordance with a PSD limit for non-OFDMA transmissions. As disclosed, the data portion may be the data portion 304 included in PPDU 3 (shown in FIG. 3) which is encoded and modulated using an encoding bandwidth 402, such that a dRU tone mapper 404 may distribute data corresponding to a first bandwidth onto a disjoint set of subcarriers 408 across a second (wider) signal bandwidth (not shown). In the depicted example, the depicted data portion of the PPDU has a defined encoding bandwidth 402 of 20 MHz or 40 MHz which the dRU tone mapper 404 maps or distributes onto disjoint even subcarriers (e.g., Tone k0 406-0, Tone k1 406-1, Tone k2 406-2, Tone k3 406-3, and/or Tone k25 406-25) within a set of subcarriers 408 across the signal bandwidth. As an example, the signal bandwidth may be 40 MHz, 80 MHz, 160 MHz, 320 MHz, or more than 320 MHz. In addition, in some embodiments, the dRU tone mapper 404 may be the dRU tone mapper 208 as shown in FIGS. 2A-2D.

In an example embodiment where the encoding bandwidth 402 is 20 MHz and the signal bandwidth 408 is 40 MHz, the dRU tone mapper 404 may distribute 234 data subcarriers to half of 468 available subcarriers included in the 40 MHz signal bandwidth 408, such that signals on the 234 subcarriers may be distributed onto two 242 RUs. As an example, data corresponding to the encoding bandwidth 402 may be distributed onto even subcarriers of two 242 RUs via a round robin distribution. In an embodiment, round robin distribution may involve dividing subcarriers included in a signal bandwidth 408 into subcarrier sets and distributing subcarriers onto each subcarrier set in a sequential manner. For example, if there are four subcarriers to be distributed and the signal bandwidth 408 has been divided into four subcarrier sets, then the first subcarrier may be distributed onto each subcarrier set. After the first subcarrier has been distributed onto each subcarrier set, the second subcarrier may be distributed onto each subcarrier set. After the second subcarrier has been distributed onto each subcarrier set, the third subcarrier may be distributed onto each subcarrier set. After the third subcarrier has been distributed onto each subcarrier set, the fourth subcarrier may be distributed onto each subcarrier set. In other embodiments, round robin distribution may involve distributing different amounts of subcarriers and dividing the signal bandwidth into different amounts of subcarrier sets using a similar technique as previously described.

In another example embodiment where the encoding bandwidth 402 is 40 MHz and the signal bandwidth 408 is at least 80 MHz, the dRU tone mapper 404 may employ an EHT OFDMA subcarrier map for each 80 MHz segment included in the data portion of the PPDU which includes a duplicated 40 MHz segment, such that data corresponding to the RU may be encoded using a 484 RU (40 MHz) which may be distributed onto each 484 RU of the signal bandwidth. For example, if the signal bandwidth is 80 MHz, then the dRU tone mapper 404 may distribute data corresponding to the RU alternatively onto even subcarriers of the two 484 RUs included in the 80 MHz signal bandwidth. In such an example, distributing data corresponding to the RU alternatively onto even subcarriers of the two 484 RUs may involve distributing a subcarrier onto a first 484 RU, then onto a second 484 RU, and repeating said distribution process for each subcarrier that is to be distributed onto the two 484 RUs. As another example, if the signal bandwidth is 160 MHz, then the dRU tone mapper 404 may distribute data corresponding to the RU onto even subcarriers of the four 484 RUs included in the 160 MHz signal bandwidth via a round robin distribution.

Figure 5:
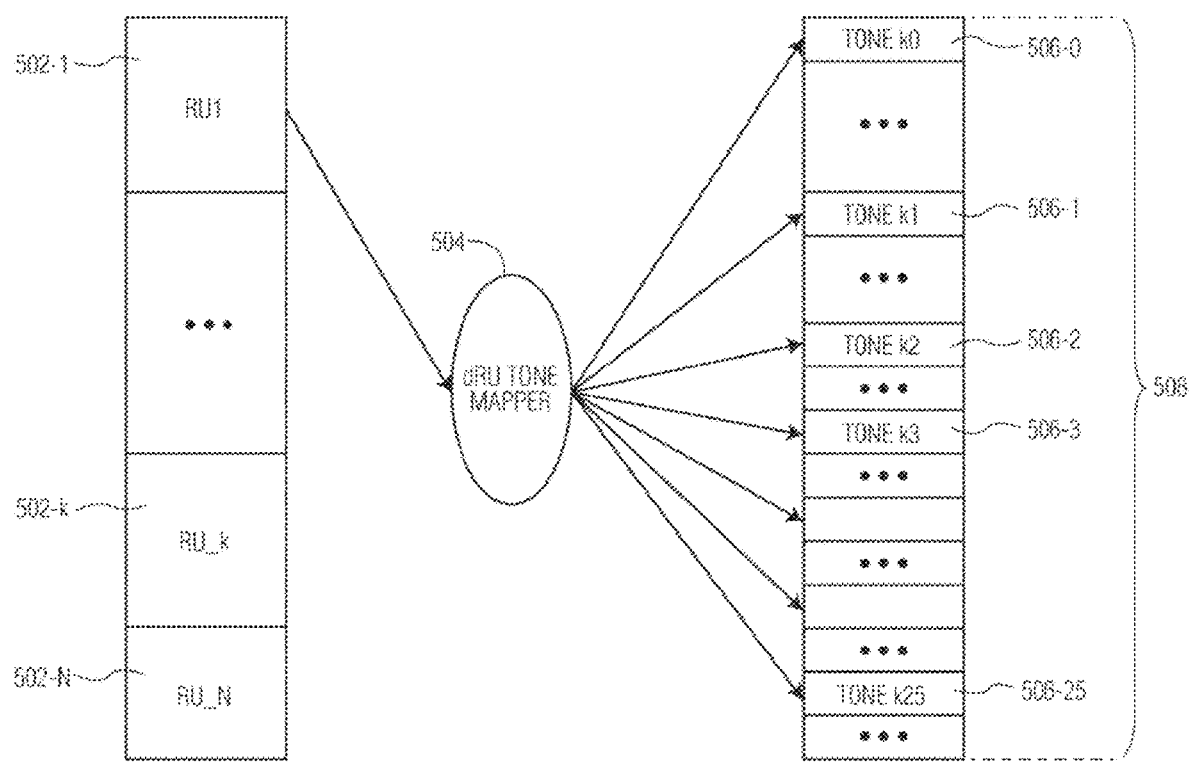
FIG. 5 illustrates an RU encoding system wherein a dRU tone mapper encodes a data portion of a PPDU into a disjoint set of subcarriers that may be transmitted by a wireless device to comply with a PSD limit for OFDMA transmissions in accordance with selected embodiments of the present disclosure.

Referring now to FIG. 5, there is shown an RU encoding system 5 wherein a dRU tone mapper 504 encodes a data portion of a PPDU into a disjoint set of subcarriers that may be transmitted by a wireless device in accordance with a PSD limit for OFDMA transmissions. As disclosed, the data portion may be the data portion 304 included in PPDU 3 (shown in FIG. 3) which is encoded and modulated using a regular RU, and then loaded by the dRU tone mapper 504 onto a dRU within a frequency unit (not shown) across a signal bandwidth (not shown). In some embodiments, the frequency unit may be 20 MHz, 40 MHz, or 80 MHz and the signal bandwidth may be 40 MHz, 80 MHz, 160 MHz, 320 MHz, or more than 320 MHz.

As disclosed herein, a dRU may be defined as a set of distributed subcarriers within a frequency unit, such that data corresponding to the dRU may be encoded and modulated as one regular RU (e.g., RU1 502-1 and optionally RU_k 502-k and/or RU_N 502-N, where "k" is an integer greater than 1 and "N" is an integer greater than k). In the depicted encoding technique of FIG. 5, data portion of the PPDU is encoded by encoding and modulating data for each dRU as one RU (e.g., RU1 502-1, RU_k 502-k, and RUN 502-N). Using the RU (e.g., RU1 502-1), the dRU tone mapper 504 distributes data corresponding to the RU (e.g., RU1 502-1) onto a disjoint set of subcarriers 508 included in a frequency unit of the signal bandwidth. In an embodiment, data corresponding to RU1 502-1 may be distributed onto subcarriers (e.g., Tone k0 506-0, Tone k1 506-1, Tone k2 506-2, Tone k3 506-3, and/or Tone k25 506-25) included in the disjoint set of subcarriers 508. In order to maximize transmission power, the distance between two subcarriers (e.g., Tone k0 506-0 and Tone k1 506-1) included in the disjoint set of subcarriers 508 may be thirteen subcarriers (1 MHz). In addition, in some embodiments, the dRU tone mapper 504 may be the dRU tone mapper 208 as shown in FIGS. 2A-2D which is designed to distribute encoded and modulated RU data onto a physical tone set. Furthermore, the technique illustrated by FIG. 5 may also be applied to PPDUs transmitted in up-link (UL) transmissions and down-link (DL) transmissions.

In an example embodiment, a frequency unit of a dRU may be 20 MHz, such that each 20 MHz segment of a signal bandwidth may include nine 26-subcarrier dRUs. To ease implementation for wireless devices operating according to the EHT communication protocol, RU size (e.g., the amount of subcarriers included in an RU) and encoding schemes as specified by the 802.11ax communication protocol may be reused and applied to each 26-subcarrier dRU. In an embodiment, a 52 RU may be defined as two 26-subcarrier dRUs. In some embodiments, each of the 26-subcarriers included in the dRU may be nine subcarriers apart. In addition, using nine 26-subcarrier dRUs may accommodate 20 MHz-operating STAs in OFDMA transmissions.

In another example embodiment, a frequency unit of a dRU may be 20 MHz, such that each 20 MHz of a signal bandwidth may include thirteen 18-subcarrier dRUs. In such embodiments, each of the 18-subcarriers included in the dRU may be thirteen subcarriers apart.

However, using thirteen 18-subcarrier dRUs may involve defining a new set of small RUs, e.g., dRU18, dRU36, dRU72, dRU144, etc. In an embodiment, using thirteen 18-subcarrier dRUs may accommodate 20 MHz-only STAs in OFDMA transmissions.

In another example embodiment, a frequency unit of a dRU may be 40 MHz, such that a signal bandwidth may include a base dRU that is either 26-subcarrier dRUs that span 40 MHz or thirteen 18-subcarrier dRUs that are each thirteen subcarriers apart and that span within 20 MHz. In such an embodiment, the eighteen 26-subcarrier dRUs or the twenty-six 18-subcarrier dRUs may be defined as the smallest dRU size and the base dRU size may be defined as one set of dRUs from each 20 MHz frequency unit, such that the base dRU covers 40 MHz. As an example, a 52-subcarrier RU may be defined as [dRU26−128, dRU26+128]. As another example, a 36-subcarrier RU may be defined as [dRU18−128, dRU18+128].

In another example embodiment, a frequency unit of a dRU may be 80 MHz, such that a signal bandwidth may include dRUs that span each 80 MHz included in the signal bandwidth. In such embodiment, the dRU sizes can be the same as regular RU sizes as specified in the 802.11ax communications protocol or the 802.11be communications protocol such as, 26-subcarrier RU, 52-subcarrier RU, 106-subcarrier RU, 242-subcarrier RU, 484-subcarrier RU, etc.

Distributed Pilot Tone Mapping Plans

In order to achieve a longer PPDU transmission range that complies with power spectrum density (PSD) limits required by the EHT communication protocol and/or next-generation communication protocols, one or more defined data and/or pilot tone mapping plans may be applied to encode the data portion 304 of each PPDU, alone or in combination with the EHT-Short Training field 302-5 and EHT-Long Training field (EHT-LTF)) 302-6 that may be loaded onto a dRU. As describe more fully hereinbelow, the pilot tone mapping plans effectively distribute pilot tones from individual logical RUs over a wider spreading or distribution frequency block having a signal bandwidth that is larger than the bandwidth of the logical RU(s). By mapping the data and pilot tones from logical RU into a distributed RU that is included in a wider spreading or distribution frequency block, more power can effectively be used to transmit the distributed RUs under the PSD constraints than would be permitted for transmitting the logical RUs.

1. First Pilot Tone Mapping Plan: Matching Data and Pilot Tone Mapping

Figure 6:
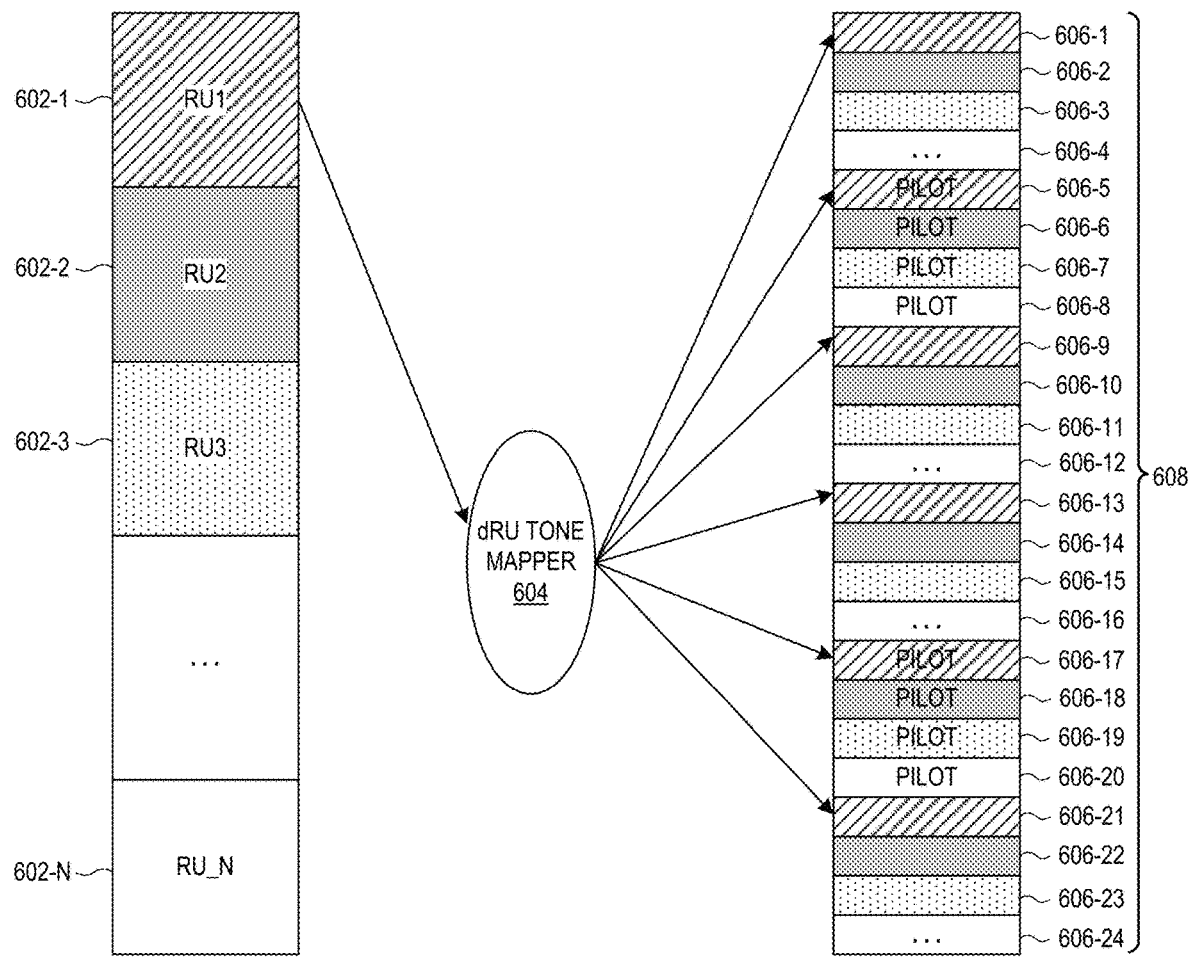
FIG. 6 illustrates an RU encoding system wherein a dRU tone mapper encodes pilot tones of a PPDU into a disjoint, distributed or scattered set of subcarriers that may be transmitted by a wireless device to comply with a PSD limit for OFDMA transmissions in accordance with selected embodiments of the present disclosure.

To provide a first example of a pilot tone mapping plan, reference is now made to FIG. 6 which illustrates an RU encoding system 6 wherein a dRU tone mapper 604 uses a first pilot tone mapping plan to encode or map RU pilot tones from each logical RU (e.g., RU1 602-1) onto disjoint, distributed or scattered set of subcarriers 608 that may be transmitted by a wireless device to comply with a PSD limit for OFDMA transmissions in accordance with selected embodiments of the present disclosure. As will be appreciated, each logical RU (e.g., RU1 602-1) may include one or more pilot tones (not shown) which are located at predetermined pilot tone positions of the logical RU. At the dRU tone mapper 404, the pilot tones for each logical RU are distributed or mapped onto a disjoint set of subcarriers 608 included in a frequency unit of the signal bandwidth. For example, the dRU tone mapper 604 maps pilot tones (not shown) from the first logical RU (e.g., RU1 602-1) onto a first set of distributed pilot tone subcarriers (e.g., 606-5, 606-17) and also maps data tones (not shown) from the first logical RU (e.g., RU1 602-1) onto a first set of distributed data tone subcarriers (e.g., 606-1, 606-9, 606-21). In addition, the dRU tone mapper 604 maps pilot tones (not shown) from the second logical RU (e.g., RU2 602-2) onto a second set of distributed pilot tone subcarriers (e.g., 606-6, 606-18) and also maps data tones (not shown) from the second logical RU (e.g., RU2 602-2) onto a second set of distributed data tone subcarriers (e.g., 606-2, 606-10, 606-22). In similar fashion example, the dRU tone mapper 604 maps pilot tones (not shown) from the third logical RU (e.g., RU3 602-3) onto a third set of distributed pilot tone subcarriers (e.g., 606-7, 606-19) and also maps data tones (not shown) from the third logical RU (e.g., RU3 602-3) onto a third set of distributed data tone subcarriers (e.g., 606-3, 606-11, 606-23). In addition, the dRU tone mapper 604 maps pilot tones (not shown) from the Nth logical RU (e.g., RUN 602-N) onto an Nth set of distributed pilot tone subcarriers (e.g., 606-8, 606-20) and also maps data tones (not shown) from the Nth logical RU (e.g., RU N 602-N) onto an Nth set of distributed data tone subcarriers (e.g., 606-4, 606-12, 606-24), and so on.

With the first pilot tone mapping plan, the pilots of different dRUs of one size are defined at the same logical location within each dRU tone set and are inserted using the same spreading or mapping rule as used with the data tones. For example, the first pilot tone is in 6th tone of the starting tone for all dRU26. As a result, the signal bandwidth for the set of subcarriers 608 includes one or more concentrated sets of pilot tones (e.g., 606-5, 606-6, 606-7, 606-8) which correspond to all the logical RUs (RU1, RU2, RU3, RU_N). Unfortunately, if the pilots from all the dRUs are concentrated in adjacent or contiguous physical tones, the receiver of the PPDU is vulnerable to narrow band interference.

As seen from the foregoing, selected embodiments of the present disclosure provide a method and apparatus for constructing a pilot subcarrier allocation and resource plan for orthogonal frequency division multiple access (OFDMA) resource units (RUs) whose subcarriers are distributed over one frequency block or the entire physical layer protocol data unit (PPDU) bandwidth. In selected embodiments, the pilot subcarriers for different dRUs of one size same use the same logical location within each dRU tone set, and the pilot tones are distributed following the same mapping rule as for distributing data tones.

2. Second Pilot Tone Mapping Plan: Travelling Pilot Index Across Logical RUs

In accordance with the selected embodiments of the present disclosure, another pilot tone mapping option that avoids the vulnerabilities to narrow band interference is for the dRU tone mapper 604 to use a second pilot tone mapping plan to encode or map RU pilot tones from each logical RU (e.g., RU1 602-1) onto disjoint, distributed or scattered set of subcarriers 608 so that there is separation or shifting between the remapped pilot tones from different dRUs. In accordance with the second pilot tone mapping plan, the pilots of different dRUs of one size are mapped or distributed following the similar spreading rule as used to map or distribute the data tones, but the logical location of pilots varies from dRU to dRU. To this end, the dRU tone mapper 604 computes the pilot tone indices for each dRU size as "travelling" pilot tone indices which shift relative to a starting tone index of each logical RU, where the amount of shift for each dRU can be implemented by computing a pilot logical index shift value that shifts for each dRU of a given size. The computed pilot logical index shift value may be computed as a function of the dRU index value, i. For example, if a specified dRU size (e.g., a 26-tone dRU) has a plurality of pilot tones (e.g., at the $6^{th}$ and $20^{th}$ tones within the RU), then for the ith dRU, the dRU tone mapper 604 may compute a pilot logical index shift by k as a function of i, where k=f(i) effectively shifts the plurality of pilot tones for each dRU. In a simple example, the pilot logical index shift value k may be computed as k=mod(i-1:RU size)+1, where the modulo values increment across a range from i-1 to RU size before returning to i-1. With this example, the first 26-tone dRU has pilots on the $6^{th}$ and $20^{th}$ tones, the second 26-tone dRU has pilots on the $7^{th}$ and $21^{th}$ tones, and the third 26-tone dRU has pilots on the $8^{th}$ and $22^{st}$ tones.

As seen from the foregoing, selected embodiments of the present disclosure provide a method and apparatus for constructing a pilot subcarrier allocation and resource plan for orthogonal frequency division multiple access (OFDMA) resource units (RUs) whose subcarriers are distributed over the entire physical layer protocol data unit (PPDU) bandwidth. In selected embodiments, the pilot subcarrier and resource allocation plan inserts pilot tones for transmission by distributing pilot tones for different dRUs of one size following the same mapping rule as for distributing data tones, but with a different offset for each of the different dRUS of the same size. For example, the pilots of different dRUs of one size may be inserted following the same spreading rule as data tones, but with the logical location of pilots varying from dRU to dRU. In such embodiments, the logical location of pilot tones may be computed as a function of the dRU index value i.

3. Third Pilot Tone Mapping Plan: Pilot Tone Table Providing Evenly Distributed Pilot Tone Distribution Across Spreading Frequency Block In accordance with selected embodiments of the present disclosure, the dRU tone mapper 604 may use other pilot tone mapping plans that achieve longer PPDU transmission ranges in compliance with power spectrum density (PSD) limits. For example, the dRU tone mapper 604 may use a third pilot tone mapping plan to encode or map RU pilot tones from each logical RU (e.g., RU1 602-1) onto disjoint, distributed or scattered set of subcarriers 608 so that the pilots for all the dRUs across the spreading frequency block are evenly or quasi-evenly distributed. In accordance with the third pilot tone mapping plan, the dRU tone mapper 604 retrieves or loads a table of pilot tone index values for all dRUs within each spreading frequency block, where the pilots are chosen or designed for all dRUs within each spreading frequency block such that every dRU of a given size has the same number of pilot tones. As disclosed herein, the choice of pilot location can be determined using any suitable approach, such as by using the travelling or shifting pilot tone indices described hereinabove, but is not necessarily limited to using travelling or shifting pilot tone indices.

As seen from the foregoing, selected embodiments of the present disclosure provide a method and apparatus for constructing a pilot subcarrier allocation and resource plan for orthogonal frequency division multiple access (OFDMA) resource units (RUs) whose subcarriers are distributed over the entire physical layer protocol data unit (PPDU) bandwidth. In selected embodiments, the pilot subcarrier and resource allocation plan inserts pilot tones for transmission by distributing pilot tones for different dRUs of one size following the same mapping rule as for distributing data tones, but with a different offset for each of the different dRUs of the same size. For example, the pilots of different dRUs of one size may be listed in one table wherein all pilots are evenly spread within the spreading frequency block, and each dRU of the same size has the same number of pilots.

4. Fourth Pilot Tone Mapping Plan: Shifted Logical Pilot Location for Smallest dRU Size and Union Pilot Selection for Larger dRUs In accordance with selected embodiments of the present disclosure, the dRU tone mapper 604 may use other pilot tone mapping plans to achieve PPDU transmission compliance with power spectrum density (PSD) limits and to facilitate simple implementation. For example, the dRU tone mapper 604 may use a fourth pilot tone mapping plan to encode or map RU pilot tones from each logical RU (e.g., RU1 602-1) onto disjoint, distributed or scattered set of subcarriers 608 so that improved resilience to narrow band interference is achieved by providing larger, minimum pilot separation or shifting between the remapped pilot tones from different dRUs. In accordance with the fourth pilot tone mapping plan, the dRU tone mapper 604 defines a logical pilot location for the smallest dRU size (e.g., 26-tone dRU), and then each dRU of the smallest size will have defined logical pilot location shifted by a shift amount. In this case, the shift amount could be defined using the travelling or shifting pilot tone indices described hereinabove, but any predetermined shift amount can be used to shift the defined logical pilot location for the dRUs of the smallest size. The fourth pilot tone mapping plan also specifies that, for each dRU of a larger size, the pilots are defined as the union (or combination) of the corresponding smaller dRU components. Thus, a dRU-52 has pilots defined by the union or combination of the pilots from the two dRU-26 components. In addition, a dRU-106 may have pilots defined by the union or combination of the pilots from the two dRU-52 components. Likewise, a dRU-242 has pilots defined by the union or combination of the pilots from the two dRU-106 components, and a dRU-484 has pilots defined by the union or combination of the pilots from the two dRU-242 components. As a result, the design only needs to design for the smallest dRU-26, and the larger dRUs are based on the smaller component dRUs.

As will be appreciated by persons skilled in the art, there may be situations where one of the larger dRUs does not use the union or combination rule for defining pilots from the smaller dRU components. For example, the 11ax standard design specifies that the dRU-106 has only 4 pilots. Thus, instead of using the union or combination approach for specifying pilots for the dRU-106 from the component dRU-52 components (which would result in 8 pilots), the fourth pilot tone mapping plan may specify that the pilots for the dRU-106 include 4 pilots constructed from two dRU-52 components (which each include 4 pilots) by choosing only 4 of the 8 dRU-52 pilots using a predetermined selection algorithm. As disclosed herein, the choice of pilots for the dRU-106 can be determined using any suitable predetermined down-selection rule. For example, the down-selection rule may use a first design rule to simply choose all four pilots from one of the dRU-52 components. In another example, the down-selection rule may use a second design rule to simply choose two pilots from the first dRU-52 component (e.g., logical pilots 1 and 3, denoted [1 3]), and may choose two more pilots from the second dRU-52 component (e.g., logical pilots 2 and 4, denoted [2 4]).

In cases where there are multiple dRU-106, the fourth pilot tone mapping plan may include a pilot selection rule that is correlated with the location or index of each dRU-106 using any suitable correlation rule. In a first example correlation rule, all pilots for each dRU-106 is selected based on the same down-selection design rule (e.g., choosing all 4 pilots from one dRU-52 component, or choosing 2 pilots each from the two dRU-52 components). In a second example correlation rule, different pilot down-selection design rules are used for even and odd index dRU-106. For example, each dRU-106 having an even index value has its four pilots selected by choosing two pilots from logical pilots 1 and 3 from first dRU-52, and by choosing the other two pilots from logical pilots 2 and 4 from the second dRU-52. Similarly, for each dRU-106 having an odd index value, the four pilots are selected by choosing two pilots are from logical pilots 2 and 4 from first dRU-52, and by choosing the other two pilots from logical pilots 1 and 3 from the second dRU-52. In a third example correlation rule, different pilot selection rules are applied for the middle half and outer half index of each dRU-106. For example, if there are a total of eight dRU-106s, then the middle half index (dRU-106[3 4 5 6]) uses a first pilot selection rule, and the outer half index (dRU-106[1 2 7 8]) uses a second pilot selection rule.

Though the examples are provided herein with reference to the dRU-106, it will be appreciated that down-selection rules may also be applied to define pilots for other large dRU sizes by selectively choosing pilots from the dRU components.

To illustrate an example of the fourth pilot tone mapping plan, reference is now made to FIG. 7 which illustrates Table 7 which lists relative pilot tone indices and shifts for different RUs distributed over a signal bandwidth of 80 MHz in accordance with selected embodiments of the present disclosure. As depicted, Table 7 defines the pilot tones for different dRU sizes (dRU-52, dRU-106, dRU-242, and dRU-484) that are transmitted over the 80 MHz signal bandwidth. In particular, the smallest dRUs (dRU-52) have their pilot tones selected by defining a logical pilot location (e.g., logical pilots (6, 20, 32, 46)) and adding a different logical pilot location shift amount for each dRU-52 for each dRU index value (e.g., i=1:16). For example, the first distributed pilot locations for dRU-52 (denoted dP52_1) are computed by adding a first logical pilot location shift amount (3) to each of the defined logical pilot locations (6, 20, 32, 46), so that the distributed pilot locations for dRU-52 are pilot locations (9, 23, 35, 49). In similar fashion, the second distributed pilot locations for dRU-52 (denoted dP52_2 are computed by adding a second different logical pilot location shift amount (2) to the defined logical pilot locations (6, 20, 32, 46), and so on. As will be appreciated, the logical pilot location shift amounts may be determined using any suitable approach (e.g., performing an exhaustive search) to ensure that the pilots are spread throughout the dRU-52.

Table 7 also defines the pilot tones for the larger dRU sizes (dRU-106, dRU-242, and dRU-484). In embodiments where only four pilots can be used for each dRU-106, the pilot tones for the middle dRU-106 are defined using a pilot down-selection rule that is correlated with the location or index value (e.g., i=1:8) of each dRU-106. For example, a first pilot down-selection rule is used to define the distributed pilots for the dRU-106 having an outer half index values (e.g., dP106_1, dP106_2, dP106_7, dP106_8), while a second pilot down-selection rule is used to define the distributed pilots for the dRU-106 having the middle half index values (e.g., dP106_3, dP106_4, dP106_5, dP106_6). In the depicted example, the first pilot down-selection rule (e.g., dP106_1) sorts the $2^{nd}$ and $4^{th}$ pilots from the first dRU-52 component (e.g., dP52_1([2,4])) and the $1^{st}$ and $3^{rd}$ pilots from the second dRU-52 component (e.g., dP52_2([1, 3])). In addition, the second pilot down-selection rule (e.g., dP106_3) sorts the $1^{st}$ and $3^{rd}$ pilots from the first dRU-52 component (e.g., dP52_5([1,3])) and the $2^{nd}$ and $4^{th}$ pilots from the second dRU-52 component (e.g., dP52_6([2,4])).

In addition, Table 7 defines the pilot tones for the larger dRU sizes (dRU-242 and dRU-484) as the union or combination of the pilots from the two component dRUs. For example, the first distributed pilot for dRU-242 (denoted dP242_1) is defined as the union or combination of the distributed pilots from the component dRU-106 components (e.g., dP106_1 and dP106_2). In addition, the second distributed pilot for dRU-242 (denoted dP242_2) is defined as the union or combination of the distributed pilots from the component dRU-106 components (e.g., dP106_3 and dP106_4), and so on. And similarly for the larger dRU-484, the first distributed pilot for dRU-484 (denoted dP484_1) is defined as the union or combination of the distributed pilots from the component dRU-242 components (e.g., dP242_1 and dP242_2), and the second distributed pilot for dRU-484 (denoted dP484_2) is defined as the union or combination of the distributed pilots from the component dRU-242 components (e.g., dP242_3 and dP242_4).

To illustrate another example of the fourth pilot tone mapping plan, reference is now made to FIG. 8 which illustrates Table 8 which lists relative pilot tone indices and shifts for different RUs distributed over a signal bandwidth of 40 MHz in accordance with selected embodiments of the present disclosure. As depicted, Table 8 defines the pilot tones for different dRU sizes (dRU-26, dRU-52, dRU-106, and dRU-242) that are transmitted over the 40 MHz signal bandwidth. In particular, the smallest dRUs (dRU-26) have their pilot tones selected by defining a logical pilot location (e.g., logical pilots (6, 20)) and adding a different logical pilot location shift amount for each dRU-26 for each dRU index value (e.g., i=1:18). For example, the first distributed pilot locations for dRU-26 (denoted dP26_1) are computed by adding a first logical pilot location shift amount (−2) to each of the defined logical pilot locations (6, 20), and the second distributed pilot locations for dRU-26 (denoted dP26_2) are computed by adding a second different logical pilot location shift amount (3) to the defined logical pilot locations (6, 20), and so on. Again, the logical pilot location shift amounts may be determined using any suitable approach (e.g., performing an exhaustive search) to ensure that the pilots are spread throughout the dRU-26.

Table 8 also defines the pilot tones for the larger dRU sizes (dRU-52 and dRU-242) as the union or combination of the pilots from the two component dRUs. For example, the first distributed pilot for dRU-52 (denoted dP52_1) is defined as the sorted union or combination of the distributed pilots from the component dRU-26 components (e.g., dP26_1 and dP26_2). In addition, the second distributed pilot for dRU-52 (denoted dP52_2) is defined as the sorted union or combination of the distributed pilots from the component dRU-26 components (e.g., dP26_3 and dP26_4), and so on. And similarly for the larger dRU-242, the first distributed pilot for dRU-242 (denoted dP242_1) is defined as the union or combination of the distributed pilots from the component dRU-106 components (e.g., dP106_1 and dP106_2), and the second distributed pilot for dRU-242 (denoted dP242_2) is defined as the union or combination of the distributed pilots from the component dRU-106 components (e.g., dP106_3 and dP106_4).

In addition, Table 8 defines the pilot tones for the middle dRU-106 which can only have four pilots. As depicted, the pilot tones for the middle dRU-106 are defined using a uniform pilot down-selection rule that is correlated with the location or index value (e.g., i=1:4) of each dRU-106. For example, the uniform pilot down-selection rule (e.g., dP106_1) sorts the $1^{st}$ and $3^{rd}$ pilots from the first dRU-52 component (e.g., dP52_1([1,3])) and the $2^{nd}$ and $4^{th}$ pilots from the second dRU-52 component (e.g., dP52_2([2,4])). In similar fashion, the uniform pilot down-selection rule (e.g., dP106_2) sorts the $1^{st}$ and $3^{rd}$ pilots from the first dRU-52 component (e.g., dP52_3([1,3])) and the $2^{nd}$ and $4^{th}$ pilots from the second dRU-52 component (e.g., dP52_4([2,4])), and so on.

To illustrate another example of the fourth pilot tone mapping plan, reference is now made to FIG. 9 which illustrates Table 9 which lists relative pilot tone indices and shifts for different RUs distributed over a signal bandwidth of 20 MHz in accordance with selected embodiments of the present disclosure. As depicted, Table 9 defines the pilot tones for different dRU sizes (dRU-26, dRU-52, and dRU-106) that are transmitted over the 20 MHz signal bandwidth. In particular, the smallest dRUs (dRU-26) have their pilot tones selected by defining a logical pilot location (e.g., logical pilots (6, 19) and adding a different logical pilot location shift amount for each dRU-26 for each dRU index value (e.g., i=1:9). For example, the first distributed pilot locations for dRU-26 (denoted dP26_1) are computed by adding a first logical pilot location shift amount (2) to each of the defined logical pilot locations (6, 19), and the second distributed pilot locations for dRU-26 (denoted dP26_2) are computed by adding a second different logical pilot location shift amount (7) to the defined logical pilot locations (6, 19), and so on. Again, the logical pilot location shift amounts may be determined using any suitable approach (e.g., performing an exhaustive search) to ensure that the pilots are spread throughout the dRU-26.

Table 9 also defines the pilot tones for the larger dRU-52 as the union or combination of the pilots from the two dRU-26 components. For example, the first distributed pilot for dRU-52 (denoted dP52_1) is defined as the sorted union or combination of the distributed pilots from the component dRU-26 components (e.g., dP26_1 and dP26_2). In addition, the second distributed pilot for dRU-52 (denoted dP52_2) is defined as the sorted union or combination of the distributed pilots from the component dRU-26 components (e.g., dP26_3 and dP26_4), and so on.

In addition, Table 9 defines the pilot tones for the middle dRU-106 which can only have four pilots. As depicted, the pilot tones for the dRU-106 are defined using a uniform pilot down-selection rule that is correlated with the location or index value (e.g., i=1:2) of each dRU-106. For example, the uniform pilot down-selection rule (e.g., dP106_1) sorts the $1^{st}$ and $3^{rd}$ pilots from the first dRU-52 component (e.g., dP52_1([1,3])) and the $2^{nd}$ and $4^{th}$ pilots from the second dRU-52 component (e.g., dP52_2([2,4])). In similar fashion, the uniform pilot down-selection rule (e.g., dP106_2) sorts the $1^{st}$ and $3^{rd}$ pilots from the first dRU-52 component (e.g., dP52_3([1,3])) and the $2^{nd}$ and $4^{th}$ pilots from the second dRU-52 component (e.g., dP52_4([2,4])).

In another example implementation of the fourth pilot tone mapping plan, each dRU size may compute distributed pilot tones from a base logical pilot index such that the pilots of every dRU are a shifted version of the base logical pilot index. As a result, each dRU of the same size will have the logical pilot location with a predetermined shift. To enable simpler pilot design implementation, each dRU size includes half of the dRUs which share the same relative shift when computing the distributed pilots. In other words, a first set of pilot location shift values may be applied to a first half of the dRUs of a given size to generate the distributed pilot tones for the first half of the dRUs, and then a uniform shift may be applied to the first set of pilot location shift values to generate a second set of pilot location shift values that are applied to a second half of the dRUs of the given size to generate the distributed pilot tones for the second half of the dRUs.

To illustrate this example implementation of the fourth pilot tone mapping plan, reference is now made to FIG. 10 wherein Table 10 lists relative pilot tone indices and shifts for different RUs distributed over a signal bandwidth of 80 MHz in accordance with selected embodiments of the present disclosure. As depicted, Table 10 defines the pilot tones for different dRU sizes (dRU-52, dRU-106, dRU-242, and dRU-484) that are transmitted over the 80 MHz signal bandwidth. In particular, the smallest dRUs (dRU-52) have their pilot tones selected by defining a base logical pilot index (e.g., logical pilots (1, 7, 27, 33)) and adding a different logical pilot location shift amount for each dRU-52 for each dRU index value (e.g., i=1:16). For example, the first distributed pilot locations for dRU-52 (denoted dP52_1) are computed by adding a first logical pilot location shift amount (4) to each of the defined logical pilot locations (1, 7, 27, 33), so that the distributed pilot locations for dRU-52 are pilot locations (5, 11, 31, 37). In similar fashion, the second distributed pilot locations for dRU-52 (denoted dP52_2) are computed by adding a second different logical pilot location shift amount (2) to the defined logical pilot locations (1, 7, 27, 33), and so on. As depicted, the sequence of logical pilot location shift amounts [4,2,7,5,3,1,6,4,16,14, 19,17,15,13,18,16] are selected so that the first half of the shift amounts [4,2,7,5,3,1,6,4] are shifted from the second half of shift amounts [16,14,19,17,15,13,18,16] by a specified shift amount (e.g., 12). In addition, the shift amounts for the first four dP52 (e.g., [4,2,7,5]) are offset from the shift amounts for the second four dP52 (e.g., [3,1,6,4]) by a uniform shift amount (e.g., −1). In addition, the shift amounts for the first two dP52 (e.g., [4,2]) are offset from the shift amounts for the second two dP52 (e.g., [7,5]) by a uniform shift amount (e.g., 3). Stated more generally, the sequence of logical pilot location shift amounts implements a hierarchical shifting property such that every half of the logical pilot location shift amounts is shifted by a set amount from the next half of logical pilot location shift amounts. This approach enables a simple shift implementation to construct the pilot design.

Table 10 also defines the pilot tones for the larger dRU sizes (dRU-106, dRU-242, and dRU-484). In embodiments where only four pilots can be used for each dRU-106, the pilot tones for the middle dRU-106 are defined using a uniform pilot down-selection rule that is correlated with the location or index value (e.g., i=1:8) of each dRU-106. For example, the uniform pilot down-selection rule (e.g., dP106_1) sorts the $1^{st}$ and $3^{rd}$ pilots from the first dRU-52 component (e.g., dP52_1([1,3])) and the $2^{nd}$ and $4^{th}$ pilots from the second dRU-52 component (e.g., dP52_2([2,4])). In similar fashion, the uniform pilot down-selection rule (e.g., dP106_2) sorts the $1^{st}$ and $3^{rd}$ pilots from the first dRU-52 component (e.g., dP52_3([1,3])) and the $2^{nd}$ and $4^{th}$ pilots from the second dRU-52 component (e.g., dP52_4([2,4])), and so on.

In addition, Table 10 defines the pilot tones for the larger dRU sizes (dRU-242 and dRU-484) as the union or combination of the pilots from the two component dRUs. For example, the first distributed pilot for dRU-242 (denoted dP242_1) is defined as the union or combination of the distributed pilots from the component dRU-106 components (e.g., dP106_1 and dP106_2). In addition, the second distributed pilot for dRU-242 (denoted dP242_2) is defined as the union or combination of the distributed pilots from the component dRU-106 components (e.g., dP106_3 and dP106_4), and so on. And similarly for the larger dRU-484, the first distributed pilot for dRU-484 (denoted dP484_1) is defined as the union or combination of the distributed pilots from the component dRU-242 components (e.g., dP242_1 and dP242_2), and the second distributed pilot for dRU-484 (denoted dP484_2) is defined as the union or combination of the distributed pilots from the component dRU-242 components (e.g., dP242_3 and dP242_4).

To illustrate another example of the fourth pilot tone mapping plan, reference is now made to FIG. 11 wherein Table 11 lists relative pilot tone indices and shifts for different RUs distributed over a signal bandwidth of 40 MHz in accordance with selected embodiments of the present disclosure. As depicted, Table 11 defines the pilot tones for different dRU sizes (dRU-26, dRU-52, dRU-106, and dRU-242) that are transmitted over the 40 MHz signal bandwidth. In particular, the smallest dRUs (dRU-26) have their pilot tones selected by defining a logical pilot location (e.g., logical pilots (1, 14)) and adding a different logical pilot location shift amount for each dRU-26 for each dRU index value (e.g., i=1:18). For example, the first distributed pilot locations for dRU-26 (denoted dP26_1) are computed by adding a first logical pilot location shift amount (1) to each of the defined logical pilot locations (1, 14), and the second distributed pilot locations for dRU-26 (denoted dP26_2) are computed by adding a second different logical pilot location shift amount (3) to the defined logical pilot locations (1, 14), and so on.

As depicted, the sequence of logical pilot location shift amounts [1,3,2,4,2,4,6,5,7,6,8,7,9,0,9,11,10,12] are selected so that the first half of the shift amounts [1,3,2,4,2,4,6,5,7] are shifted from the second half of shift amounts [6,8,7,9,0,9,11,10,12] by a specified shift amount (e.g., 5). In addition, the shift amounts for the first four dP52 (e.g., [1,3,2,4]) are offset from the shift amounts for the second four dP52 (e.g., [4,6,5,7]) by a uniform shift amount (e.g., 3). In addition, the shift amounts for the first two dP52 (e.g., [1,3]) are offset from the shift amounts for the second two dP52 (e.g., [2,4]) by a uniform shift amount (e.g., 1). Again, the hierarchical shifting property of the sequence of logical pilot location shift amounts enables a simple shift implementation to construct the pilot design.

Table 11 also defines the pilot tones for the larger dRU sizes (dRU-52 and dRU-242) as the union or combination of the pilots from the two component dRUs. For example, the first distributed pilot for dRU-52 (denoted dP52_1) is defined as the sorted union or combination of the distributed pilots from the component dRU-26 components (e.g., dP26_1 and dP26_2). In addition, the second distributed pilot for dRU-52 (denoted dP52_2) is defined as the sorted union or combination of the distributed pilots from the component dRU-26 components (e.g., dP26_3 and dP26_4), and so on. And similarly for the larger dRU-242, the first distributed pilot for dRU-242 (denoted dP242_1) is defined as the union or combination of the distributed pilots from the component dRU-106 components (e.g., dP106_1 and dP106_2), and the second distributed pilot for dRU-242 (denoted dP242_2) is defined as the union or combination of the distributed pilots from the component dRU-106 components (e.g., dP106_3 and dP106_4).

In addition, Table 11 defines the pilot tones for the middle dRU-106 which can only have four pilots. As depicted, the pilot tones for the middle dRU-106 are defined using a uniform pilot down-selection rule that is correlated with the location or index value (e.g., i=1:4) of each dRU-106. For example, the uniform pilot down-selection rule (e.g., dP106_1) sorts the $1^{st}$ and $3^{rd}$ pilots from the first dRU-52 component (e.g., dP52_1([1,3])) and the $2^{nd}$ and $4^{th}$ pilots from the second dRU-52 component (e.g., dP52_2([2,4])). In similar fashion, the uniform pilot down-selection rule (e.g., dP106_2) sorts the $1^{st}$ and $3^{rd}$ pilots from the first dRU-52 component (e.g., dP52_3([1,3])) and the $2^{nd}$ and $4^{th}$ pilots from the second dRU-52 component (e.g., dP52_4([2,4])), and so on.

To illustrate another example of the fourth pilot tone mapping plan, reference is now made to FIG. 12 wherein Table 12 lists relative pilot tone indices and shifts for different RUs distributed over a signal bandwidth of 20 MHz in accordance with selected embodiments of the present disclosure. As depicted, Table 12 defines the pilot tones for different dRU sizes (dRU-26, dRU-52, and dRU-106) that are transmitted over the 20 MHz signal bandwidth. In particular, the smallest dRUs (dRU-26) have their pilot tones selected by defining a logical pilot location (e.g., logical pilots (1, 14) and adding a different logical pilot location shift amount for each dRU-26 for each dRU index value (e.g., i=1:9). For example, the first distributed pilot locations for dRU-26 (denoted dP26_1) are computed by adding a first logical pilot location shift amount (0) to each of the defined logical pilot locations (1, 14), and the second distributed pilot locations for dRU-26 (denoted dP26_2) are computed by adding a second different logical pilot location shift amount (2) to the defined logical pilot locations (1, 14), and so on. Again, the sequence of logical pilot location shift amounts [0,2,5,7,12,4,6,9,11] are selected so that the first half of the shift amounts [0,2,5,7] are shifted from the second half of shift amounts [4,6,9,11] by a specified shift amount (e.g., 4). In addition, the shift amounts for the first two dP52 (e.g., [0,2]) are offset from the shift amounts for the second two dP52 (e.g., [5,7]) by a uniform shift amount (e.g., 5). Again, the hierarchical shifting property of the sequence of logical pilot location shift amounts enables a simple shift implementation to construct the pilot design.

Table 11 also defines the pilot tones for the larger dRU-52 as the union or combination of the pilots from the two dRU-26 components. For example, the first distributed pilot for dRU-52 (denoted dP52_1) is defined as the sorted union or combination of the distributed pilots from the component dRU-26 components (e.g., dP26_1 and dP26_2). In addition, the second distributed pilot for dRU-52 (denoted dP52_2) is defined as the sorted union or combination of the distributed pilots from the component dRU-26 components (e.g., dP26_3 and dP26_4), and so on.

In addition, Table 11 defines the pilot tones for the dRU-106 which can only have four pilots. As depicted, the pilot tones for the dRU-106 are defined using a uniform pilot down-selection rule that is correlated with the location or index value (e.g., i=1:2) of each dRU-106. For example, the uniform pilot down-selection rule (e.g., dP106_1) sorts the $1^{st}$ and $3^{rd}$ pilots from the first dRU-52 component (e.g., dP52_1([1,3])) and the $2^{nd}$ and $4^{th}$ pilots from the second dRU-52 component (e.g., dP52_2([2,4])). In similar fashion, the uniform pilot down-selection rule (e.g., dP106_2) sorts the $1^{st}$ and $3^{rd}$ pilots from the first dRU-52 component (e.g., dP52_3([1,3])) and the $2^{nd}$ and $4^{th}$ pilots from the second dRU-52 component (e.g., dP52_4([2,4])).

As seen from the foregoing, selected embodiments of the present disclosure provide a method and apparatus for constructing a pilot subcarrier allocation and resource plan for orthogonal frequency division multiple access (OFDMA) resource units (RUs) whose subcarriers are distributed over the entire physical layer protocol data unit (PPDU) bandwidth. In selected embodiments, the pilot subcarrier and resource allocation plan inserts pilot tones for transmission by constructing the logical pilot location within each dRU based on the logical pilot location of smallest dRU size. In such embodiments, the pilots of the smallest dRU size may be constructed such that the logical pilot location set of each smallest dRU is an offset from one common base logical pilot location set. In addition, the pilots of the larger dRU sizes may be constructed as the union or combination of component dRUs used to form the larger dRU. In selected embodiments, the pilot tone locations for the 106-tone dRU are constructed from two 52-tone dRUs following a down-selection rule that is related to the RU106 index. For example, the down-selection rule for the 106-tone dRU may follow one rule for a first half of the pilot tone locations for the 106-tone dRU, and may follow a second rule for a second half of the pilot tone locations for the 106-tone dRU.

5. Fifth Pilot Tone Mapping Plan: Shifted Pilot Location Across RUs

In accordance with selected embodiments of the present disclosure, the dRU tone mapper 604 may use other pilot tone mapping plans to achieve PPDU transmission compliance with power spectrum density (PSD) limits and facilitate simple implementation. For example, the dRU tone mapper 604 may use a fifth pilot tone mapping plan to encode or map RU pilot tones from each logical RU (e.g., RU1 602-1) onto disjoint, distributed or scattered set of subcarriers 608 so that improved resilience to narrow band interference is achieved by providing larger, minimum pilot separation or shifting between the remapped pilot tones from different dRUs. In accordance with the fifth pilot tone mapping plan, the dRU tone mapper 604 defines, for each dRU size, the pilot indices (either physical or logical indexes) of each RU location to be a shifted version of the first RU or some predefined base pilot tone set. As will be appreciated by those skilled in the art, a logical index refers to the tone order index values within a dRU, while the physical index refers to the absolute tone index values within the entire signal bandwidth. To this end, fifth pilot tone mapping plan specifies that the physical or logical pilot indices for the smallest dRU size (e.g., 26-tone dRU) will have predefined logical and/or physical pilot locations wherein a minimum physical pilot tone spacing (e.g., 10 or 11 tones) is maintained. In addition, the fifth pilot tone mapping plan specifies that, for each larger dRU (e.g., larger than the smallest dRU), the pilots are constructed from the corresponding smaller dRU components, such as by constructing the larger dRU pilots as the union or combination of the corresponding smaller dRU components. In situations where one of the larger dRUs (e.g., dRU-106) is confined to a smaller set of pilots than would be created by the union or combination rule, the fifth pilot tone mapping plan may specify the selection of only 4 pilots for the dRU106 that are constructed from two components dRU52 (4 pilots each), so only 4 out of 8 pilots will be chosen and the dRU-106 pilots also satisfy the shifting property. As a result of the fifth pilot tone plan, for each dRU size, the pilot spreading within the RU will also be maximized.

To illustrate an example implementation of the fifth pilot tone mapping plan wherein shifting from a set of base pilot tone indices is used define pilots for each dRU size, reference is now made to FIG. 13 wherein Table 13 lists relative pilot tone physical indices and shifts for different RUs distributed over a signal bandwidth of 20 MHz in accordance with selected embodiments of the present disclosure. As depicted, Table 13 defines the pilot tones for different dRU sizes (dRU-26, dRU-52, and dRU-106) that are transmitted over the 20 MHz signal bandwidth. In particular, the smallest dRUs (dRU-26) have their pilot tones selected by defining base pilot tone physical indices (e.g., [−111 15]) and adding a different pilot location shift amount for each dRU-26 for each dRU index value (e.g., i=1:9). For example, the first distributed pilot locations for dRU-26 (denoted dP26_1) are computed by adding a first pilot location shift amount (0) to each of the defined pilot tone physical indices [−111 15], so that the distributed pilot tone physical indices for dRU-26_1 are pilot tone physical indices [−111 15] (which correspond to pilot tone logical indices [2 15]). In similar fashion, the second distributed pilot locations for dRU-26 (denoted dP26_2) are computed by adding a second different logical pilot location shift amount (22) to the defined pilot tone physical indices [−111 15], thereby generating shifted pilot indices which correspond to pilot tone logical indices [4 17]), and so on. As depicted, the sequence of logical pilot location shift amounts [0,22,11,33, 44,55,77,66,88] are selected to maintain a uniform separation of 11 tones between each pilot tone.

Table 13 also defines the pilot tones for the larger dRU-52 with reference to a set of base pilot tone physical indices (e.g., [−111 −89 15 37]) that are shifted by different pilot location shift amounts. For example, the first distributed pilot locations for dRU-52 (denoted dP52_1) uses the base pilot tone physical indices (e.g., [−111 −89 15 37]) (e.g., with a shift amount of 0), so that the distributed pilot tone physical indices for dRU-52_1 are pilot tone physical indices [−111 −89 15 37] which correspond to the sorted union or combination of the pilots from the two dRU-26 components (dP26_1 and dP26_2). In similar fashion, the second distributed pilot locations for dRU-52 (denoted dP52_2) are computed by adding a pilot location shift amount (11) to the base pilot tone physical indices (e.g., [−111 −89 15 37]) which correspond to the sorted union or combination of the pilots from the two dRU-26 components (dP26_3 and dP26_4), and so on.

In addition, Table 13 defines the pilot tones for the dRU-106 which can only have four pilots. As depicted, the pilot tones for the dRU-106 are defined with reference to a set of base pilot tone physical indices (e.g., [−111 −78 15 48]) that are shifted by different pilot location shift amounts, thereby effectively implementing a uniform pilot down-selection rule that is correlated with the location or index value (e.g., i=1:2) of each dRU-106. For example, the first distributed pilot locations for dRU-106 (denoted dP106 1) uses the base pilot tone physical indices (e.g., [−111 −78 15 48]) (e.g., with a shift amount of 0), so that the distributed pilot tone physical indices for dRU-106_1 are pilot tone physical indices [−111 −78 15 48] which correspond to applying a uniform pilot down-selection rule which selects the $1^{st}$ and $3^{rd}$ pilots from the first dRU-52 component (e.g., dP52_1([1,3])) and the $2^{nd}$ and $4^{th}$ pilots from the second dRU-52 component (e.g., dP52_2([2,4])). In similar fashion, the second distributed pilot locations for dRU-106 (denoted dP106_2) applies a shift value (e.g., 55) to the base pilot tone physical indices (e.g., [−111 −78 15 48]), so that the distributed pilot tone physical indices for dRU-106_2 are pilot tone physical indices [−56 −23 70 103] which correspond to applying a uniform pilot down-selection rule which selects the $1^{st}$ and $3^{rd}$ pilots from the third dRU-52 component (e.g., dP52_3([1,3])) and the $2^{nd}$ and $4^{th}$ pilots from the fourth dRU-52 component (e.g., dP52_4([2,4])).

Figure 14:
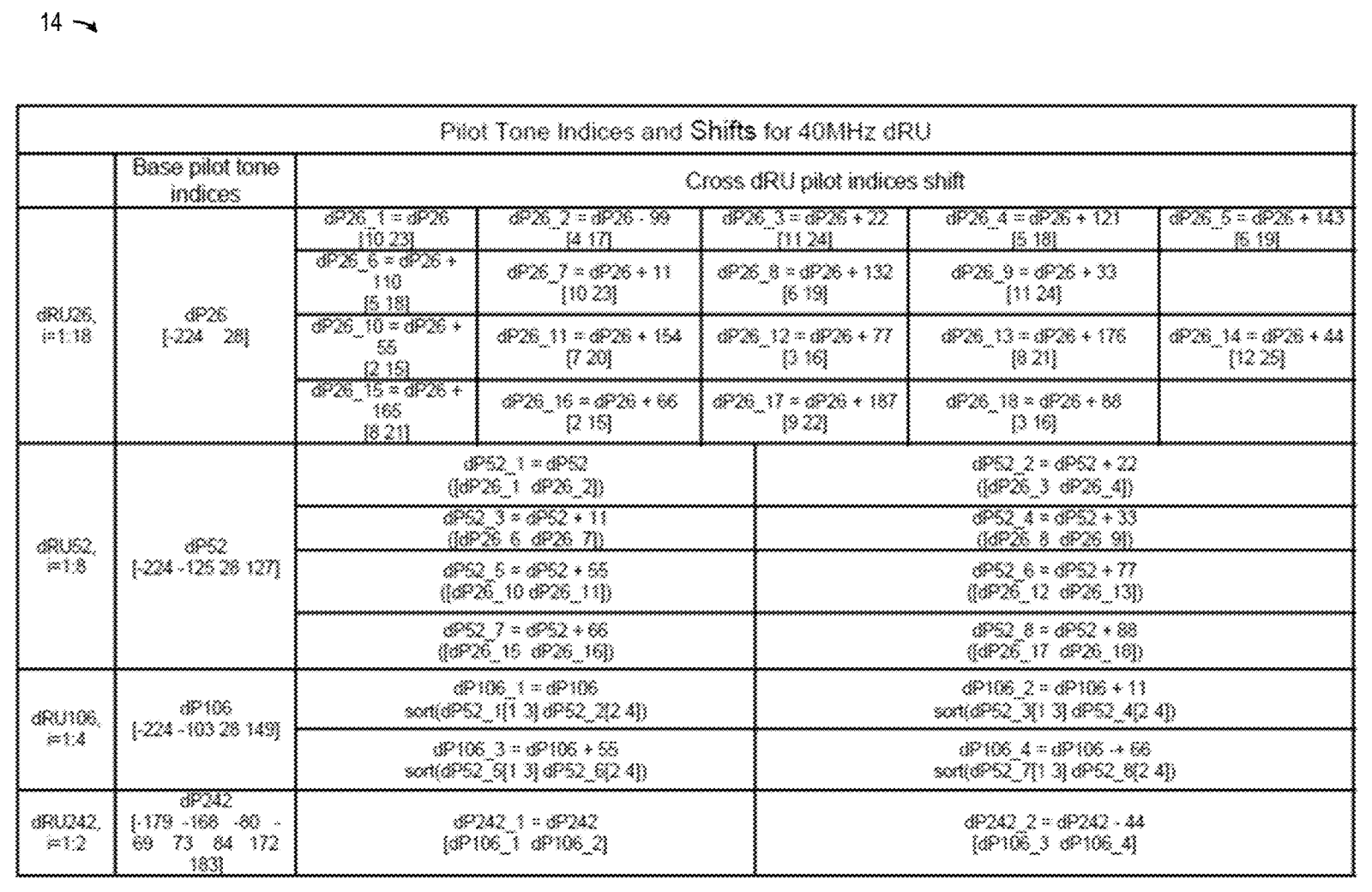

To illustrate an example implementation of the fifth pilot tone mapping plan wherein shifting from a set of base pilot tone indices is used define pilots for each dRU size, reference is now made to FIG. 14 wherein Table 14 lists relative pilot tone physical indices and shifts for different RUs distributed over a signal bandwidth of 40 MHz in accordance with selected embodiments of the present disclosure. As depicted, Table 14 defines the pilot tones for different dRU sizes (dRU-26, dRU-52, dRU-106, and dRU-242) that are transmitted over the 40 MHz signal bandwidth. In particular, the smallest dRUs (dRU-26) have their pilot tones selected by defining a set of base pilot tone physical indices (e.g., [−224 28])) and adding a different pilot location shift amount for each dRU-26 for each dRU index value (e.g., i=1:18). For example, the first distributed pilot locations for dRU-26 (denoted dP26_1) are computed by adding a first pilot location shift amount (0) to each of the defined pilot tone physical indices [−224 28], so that the distributed pilot tone physical indices for dRU-26_1 are pilot tone physical indices [−224 28] (which correspond to pilot tone logical indices [10 23]). In similar fashion, the second distributed pilot locations for dRU-26 (denoted dP26_2) are computed by adding a second different logical pilot location shift amount (−99) to the defined pilot tone physical indices [−224 28], thereby generating shifted pilot indices which correspond to pilot tone logical indices [4 17]), and so on. As depicted, the sequence of logical pilot location shift amounts [0, −99, 22, 121, 143, 110, 11, 132, 33, 55, 154, 77, 176, 44, 165, 66, 187, 88] are selected to maintain a uniform separation of 11 tones between each pilot tone.

Table 14 also defines the pilot tones for the larger dRU-52 with reference to a set of base pilot tone physical indices (e.g., [−224 −125 28 127]) that are shifted by different pilot location shift amounts. For example, the first distributed pilot locations for dRU-52 (denoted dP52_1) uses the base pilot tone physical indices (e.g., [−224 −125 28 127]) (e.g., with a shift amount of 0), so that the distributed pilot tone physical indices for dRU-52_1 are pilot tone physical indices [−224 −125 28 127] which correspond to the union or combination of the pilots from the two dRU-26 components (dP26_1 and dP26_2). In similar fashion, the second distributed pilot locations for dRU-52 (denoted dP52_2) are computed by adding a pilot location shift amount (22) to the base pilot tone physical indices (e.g., [−224 −125 28 127]) which correspond to the union or combination of the pilots from the two dRU-26 components (dP26_3 and dP26_4), and so on. As seen, Table 14 also defines the pilot tones for the larger dRU-242 with reference to a set of base pilot tone physical indices (e.g., [−179, −168, −80, −69, 73, 84, 172, 183]) that are shifted by different pilot location shift amounts (e.g., 0 and 44) to implement a union or combination of the pilots from the dRU-106 components.

In addition, Table 14 defines the pilot tones for the dRU-106 which can only have four pilots. As depicted, the pilot tones for the dRU-106 are defined with reference to a set of base pilot tone physical indices (e.g., [−224, −103, 28, 149]) that are shifted by different pilot location shift amounts, thereby effectively implementing a uniform pilot down-selection rule that is correlated with the location or index value (e.g., i=1:4) of each dRU-106. For example, the first distributed pilot locations for dRU-106 (denoted dP106_1) uses the base pilot tone physical indices (e.g., [−224, −103, 28, 149]) (e.g., with a shift amount of 0), so that the distributed pilot tone physical indices for dRU-106_1 are pilot tone physical indices [−224, −103, 28, 149] which correspond to applying a uniform pilot down-selection rule which selects the $1^{st}$ and $3^{rd}$ pilots from the first dRU-52 component (e.g., dP52_1([1,3])) and the $2^{nd}$ and $4^{th}$ pilots from the second dRU-52 component (e.g., dP52_2([2,4])). In similar fashion, the second distributed pilot locations for dRU-106 (denoted dP106_2) applies a shift value (e.g., 11) to the base pilot tone physical indices (e.g., [−224, −103, 28, 149]), so that the distributed pilot tone physical indices for dRU-106_2 are pilot tone physical indices [−213 −92 39 160] which correspond to applying a uniform pilot down-selection rule which selects the $1^{st}$ and $3^{rd}$ pilots from the third dRU-52 component (e.g., dP52_3([1,3])) and the $2^{nd}$ and $4^{th}$ pilots from the fourth dRU-52 component (e.g., dP52_4([2,4])).

Figure 15:
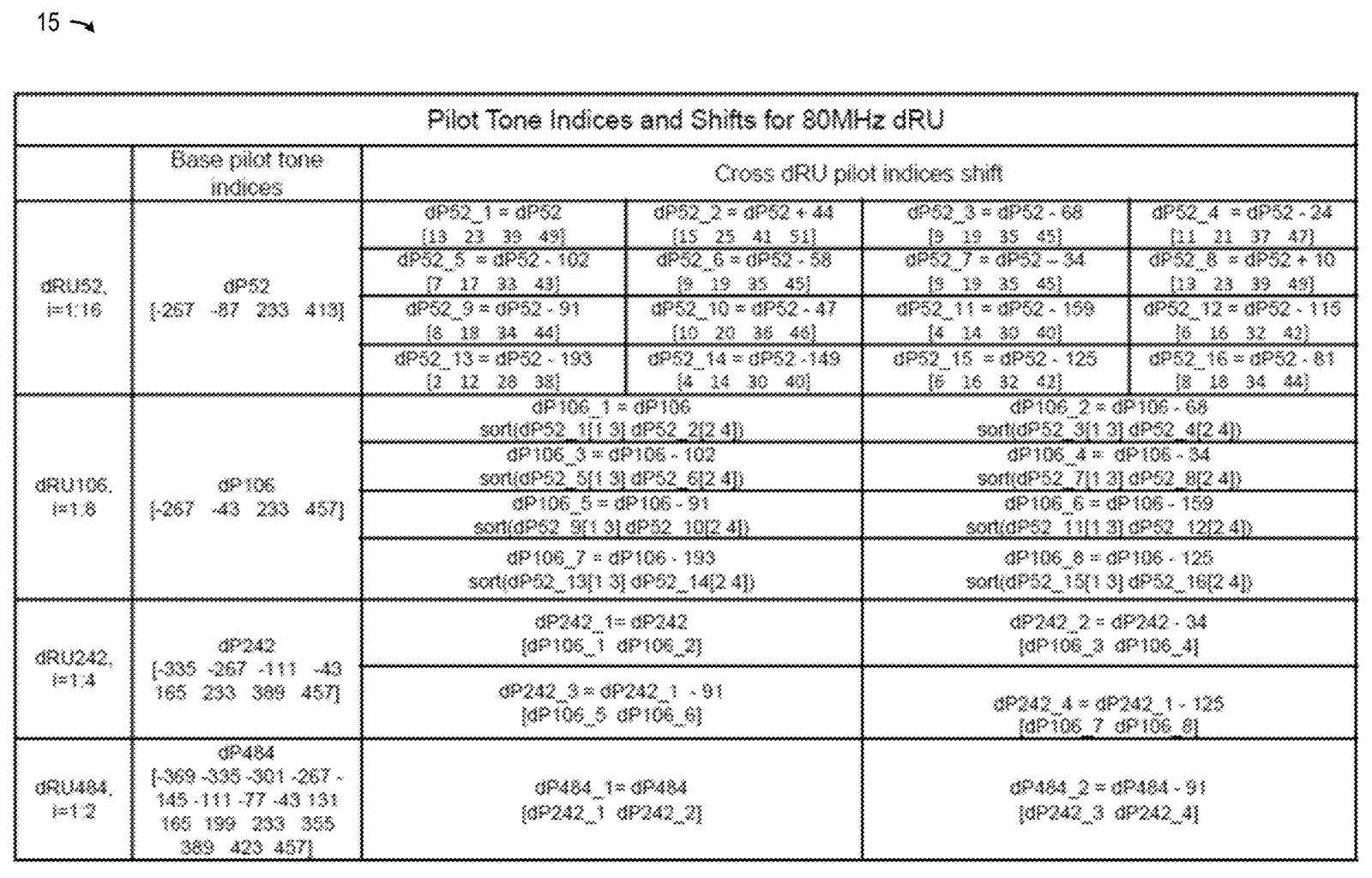

To illustrate an example implementation of the fifth pilot tone mapping plan wherein shifting from a set of base pilot tone indices is used define pilots for each dRU size, reference is now made to FIG. 15 wherein Table 15 lists relative pilot tone physical indices and shifts for different RUs distributed over a signal bandwidth of 80 MHz in accordance with selected embodiments of the present disclosure. As depicted, Table 15 defines the pilot tones for different dRU sizes (dRU-52, dRU-106, dRU-242, and dRU-484) that are transmitted over the 80 MHz signal bandwidth. In particular, the smallest dRUs (dRU-52) have their pilot tones selected by defining a set of base pilot tone physical indices (e.g., [−267, −87, 233, 413])) and adding a different pilot location shift amount for each dRU-52 for each dRU index value (e.g., i=1:16). For example, the first distributed pilot locations for dRU-52 (denoted dP52_1) are computed by adding a first pilot location shift amount (0) to each of the defined pilot tone physical indices [−267, −87, 233, 413], so that the distributed pilot tone physical indices for dRU-52_1 are pilot tone physical indices [−267, −87, 233, 413] (which correspond to pilot tone logical indices [13 23 39 49]). In similar fashion, the second distributed pilot locations for dRU-52 (denoted dP52_2) are computed by adding a second different logical pilot location shift amount (44) to the defined pilot tone physical indices [−267, −87, 233, 413], thereby generating shifted pilot indices which correspond to pilot tone logical indices [15 25 41 51]), and so on. As depicted, the sequence of logical pilot location shift amounts [0, 44, 68, 24, −102, −58, −34, 10, −91, −47, −159, −115, −193, −149, −125, −81] are selected to maintain a minimum separation of 10 tones between each pilot tone.

Table 15 also defines the pilot tones for the larger dRUs (e.g., dRU-242, dRU-484) with reference to a set of base pilot tone physical indices for each dRU size that are shifted by different pilot location shift amounts. For example, the first distributed pilot locations for dRU-242 (denoted dP242_1) uses the base pilot tone physical indices (e.g., [−335 −267 −111 −43 165 233 289 457]) (e.g., with a shift amount of 0), so that the distributed pilot tone physical indices for dRU-242_1 are pilot tone physical indices [−335 −267 −111 −43 165 233 289 457] which correspond to the union or combination of the pilots from the two dRU-26 components (dP106_1 and dP106_2). In similar fashion, the second distributed pilot locations for dRU-242 (denoted dP242_2) are computed by adding a pilot location shift amount (−34) to the base pilot tone physical indices to generate distributed pilot tones which correspond to the union or combination of the pilots from the two dRU-106 components (dP106_3 and dP106_4), and so on. As seen, Table 15 also defines the pilot tones for the larger dRU-484 with reference to a set of base pilot tone physical indices (e.g., [−369 −335 −301 . . . ]) that are shifted by different pilot location shift amounts (e.g., 0 and −91) to implement a union or combination of the pilots from the dRU-242 components.

In addition, Table 15 defines the pilot tones for the dRU-106 which can only have four pilots. As depicted, the pilot tones for the dRU-106 are defined with reference to a set of base pilot tone physical indices (e.g., [−267 −43 233 457]) that are shifted by different pilot location shift amounts, thereby effectively implementing a uniform pilot down-selection rule that is correlated with the location or index value (e.g., i=1:8) of each dRU-106. For example, the first distributed pilot locations for dRU-106 (denoted dP106 1) uses the base pilot tone physical indices (e.g., [−267 −43 233 457]) (e.g., with a shift amount of 0), so that the distributed pilot tone physical indices for dRU-106_1 are pilot tone physical indices [−267 −43 233 457] which correspond to applying a uniform pilot down-selection rule which selects the $1^{st}$ and $3^{rd}$ pilots from the first dRU-52 component (e.g., dP52_1([1,3])) and the $2^{nd}$ and $4^{th}$ pilots from the second dRU-52 component (e.g., dP52_2([2,4])). In similar fashion, the second distributed pilot locations for dRU-106 (denoted dP106_2) applies a shift value (e.g., −68) to the base pilot tone physical indices (e.g., [−267 −43 233 457]), so that the distributed pilot tone physical indices for dRU-106_2 are pilot tone physical indices [−335 −111 165 389] which correspond to applying a uniform pilot down-selection rule which selects the $1^{st}$ and $3^{rd}$ pilots from the third dRU-52 component (e.g., dP52_3([1,3])) and the $2^{nd}$ and $4^{th}$ pilots from the fourth dRU-52 component (e.g., dP52_4([2,4])).

As seen from these examples of the fifth pilot tone mapping plan, the edge tones gap and DC tone gap are defined to be as large as possible. In addition, the minimum dRU106 pilot tone separation is 11 and simple construction rule using predefined selection from the component two dRU52.

To illustrate the pilot tone physical indices corresponding to the pilot tone logical indices depicted in the Tables 13-15, reference is now made to FIG. 16. In particular, Table 16A lists the pilot tone physical indices corresponding to the pilot tone logical index values listed in Table 13 for different RUs distributed over a signal bandwidth of 20 MHz. In addition, Table 16B lists the pilot tone physical indices corresponding to the pilot tone logical index values listed in Table 14 for different RUs distributed over a signal bandwidth of 40 MHz. And Table 16C lists the pilot tone physical indices corresponding to the pilot tone logical index values listed in Table 15 for different RUs distributed over a signal bandwidth of 80 MHz.

Figure 17:
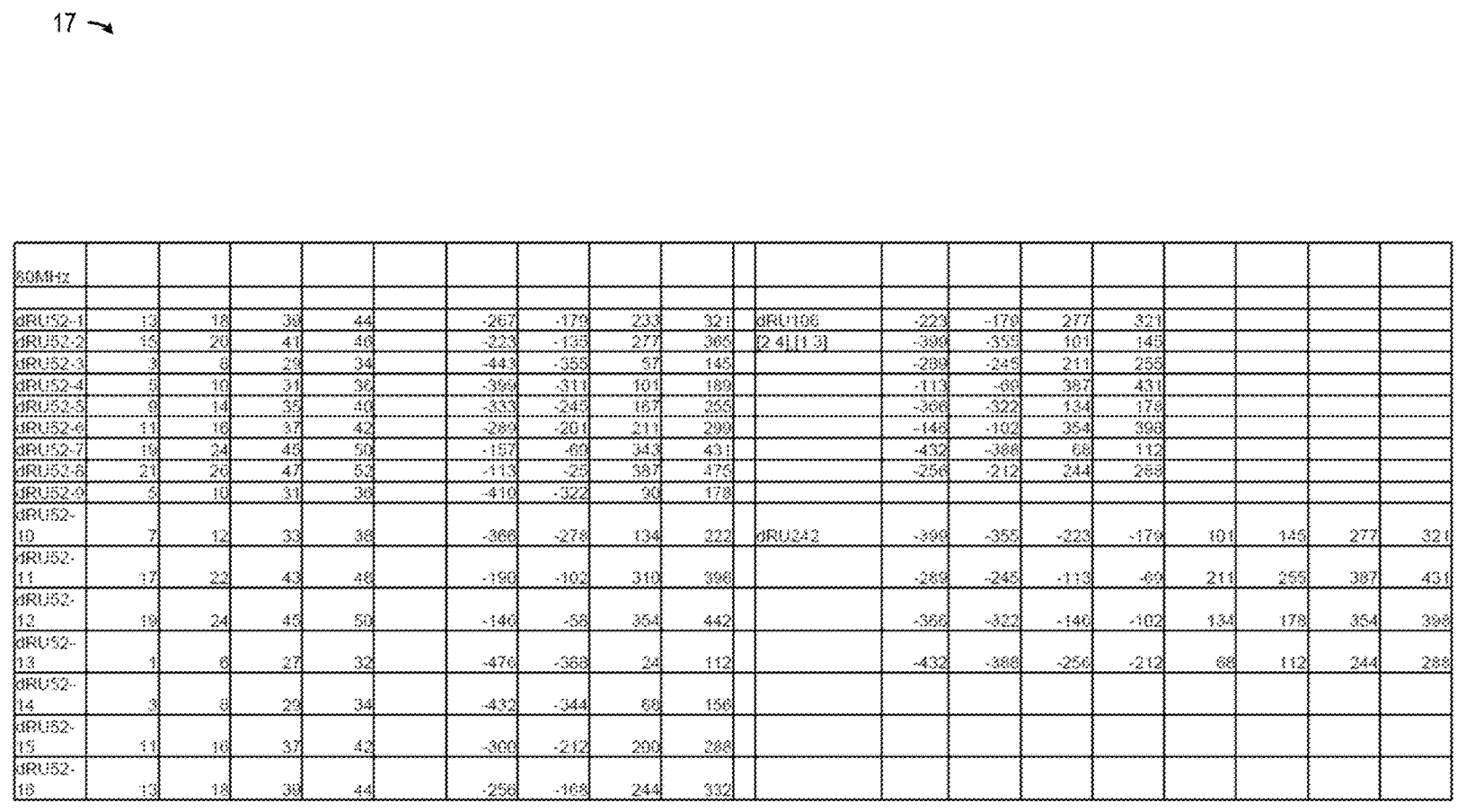

As will be appreciated, the fifth pilot tone mapping plan can be implemented with one set of base pilot tone indices for each dRU size and different offset value for all dRU of the same size, without storing the entire pilot tone map. For example, reference is now made to FIG. 17 which lists the pilot tone logical index values and corresponding physical index values for different RUs distributed over a signal bandwidth of 80 MHz to provide a minimum separation of 11 tones between pilot tones. As depicted, the pilot tones for the smallest dRU-52 are computed from a set of base pilot logical indices ([13 18 39 44]) (or corresponding base pilot physical indices ([−267 −179 233 321]) by applying different shift amounts [0, 2, −10, −8, −4, −2, 6, 8, −8, −6, 4, 6, −12, −10, −2, 0]. In addition, the pilot tones for the middle dRU-106 are computed from a set of base pilot tone physical indices (e.g., [−223 −179 277 321]) that are shifted by different pilot location shift amounts, thereby effectively implementing a uniform pilot down-selection rule that is correlated with the location or index value (e.g., i=1:8) of each dRU-106 by selecting the $2^{nd}$ and $4^{th}$ pilots from the first dRU-52 component (e.g., dP52_1([2,4])) and the $1^{st}$ and $3^{rd}$ pilots from the second dRU-52 component (e.g., dP52_2 ([1,3])).

As seen from the foregoing, selected embodiments of the present disclosure provide a method and apparatus for constructing a pilot subcarrier allocation and resource plan for orthogonal frequency division multiple access (OFDMA) resource units (RUs) whose subcarriers are distributed over the entire physical layer protocol data unit (PPDU) bandwidth. In selected embodiments, the pilot subcarrier and resource allocation plan inserts pilot tones for transmission by constructing the logical pilot location set of each dRU size to be offset from one common base logical pilot location set for the smallest dRU size.

6. Data Tone Mapping Plan: Uniformly Spreading Distributed Data Subcarriers Over Entire Spreading Spectrum In accordance with selected embodiments of the present disclosure, the dRU tone mapper 604 may also implement data tone mapping plans to achieve PPDU transmission compliance with power spectrum density (PSD) limits. For example, the dRU tone mapper 604 may use a data tone mapping plan to distribute subcarriers among resource units (RUs) such that, for each distributed RU, its allocated data subcarriers are perfectly uniformly spread over the entire operating bandwidth or spreading spectrum in wireless local area networks except for a few null subcarriers around the direct current (DC) value (namely, the center frequency in the baseband subcarrier spectrum). In an example embodiment wherein a 40 MHz PPDU is used to transmit different sized dRUs (i.e., a 26-tone dRU, a 52-tone dRU, 106-tone dRU, and a 242-tone dRU), the data tone mapping plan provides for uniformly spread data subcarriers by providing a minimum spread or period of 18 subcarriers for each 26-tone dRU, a minimum spread or period of 8 subcarriers for each a 52-tone dRU, a minimum spread or period of 4 subcarriers for each 106-tone dRU, and a minimum spread or period of 2 subcarriers for each a 242-tone dRU. In another example embodiment wherein an 80 MHz PPDU is used to transmit different sized dRUs (i.e., a 52-tone dRU, 106-tone dRU, a 242-tone dRU, and a 424-tone dRU), the data tone mapping plan provides for uniformly spread data subcarriers by providing a minimum spread or period of 18 subcarriers for each 52-tone dRU, a minimum spread or period of 8 subcarriers for each a 106-tone dRU, a minimum spread or period of 4 subcarriers for each 242-tone dRU, a minimum spread or period of 4 subcarriers for each a 242-tone dRU, and a minimum spread or period of 2 subcarriers for each a 484-tone dRU.

Stated more generally, the present disclosure provides a design methodology for distributing subcarriers among all dRUs by allocating subcarriers for each distributed RU to be uniformly spread over the entire spreading frequency. For a given dRU size, the goal of design is to allocate subcarriers evenly to all dRUs without overlap (e.g., no two dRUs share an allocated data subcarrier) over the entire operating bandwidth (excluding a few null subcarriers around DC). Two example embodiments will now be described with reference to designing dRU subcarrier allocation for a 40 MHz PPDU and an 80 MHz PPDU. In the design methodology, the term $dRU_i^t$ denotes the set of subcarrier indices assigned for the ith t-tone dRU. For each perfectly uniformly distributed RU, the "period" of subcarrier distribution is defined as the common difference between two consecutive subcarrier indices. In other words, the period is the number of subcarriers in the spreading spectrum which form a gap between allocated data subcarriers. For a large size dRU, the period of its subcarrier indices is a power of 2. For a small size dRU, the period of its subcarrier indices is an even number which is not a power of 2.

Distributed RU Design for 40 MHz PPDU

For a 40 MHz PPDU, a 26-tone dRU is a small size dRU, and 52-tone, 106-tone, and 242-tone dRUs are large size dRUs. In order to obtain perfectly uniformly spread data subcarriers over the 40 MHz PPDU, the period of subcarrier indices for each dRU size (RU size) is given in the following table:

| dRU size | 26-tone | 52-tone | 106-tone | 242-tone |
|---|---|---|---|---|
| period | 18 | 8 | 4 | 2 |

To provide a mathematical description of the dRU subcarrier allocation for a 40 MHz PPDU, let $\mathcal{Z}$ denote the set of integers between 0 and (RU size—1). In addition, let $\mathcal{S}_{26}$, $\mathcal{S}_{52}$, $\mathcal{S}_{106}$, and $\mathcal{S}_{242}$ denote the sets of "used subcarriers" for all 26-tone dRUs, all 52-tone dRUs, all 106-tone dRUs, and all 242-tone dRUs, respectively. With these denotations, the set of subcarrier indices for each dRU (e.g., $dRU_i^{26}$) may each be defined in terms of a period term (e.g., 18k) and an integer shift value (e.g., $r_i^6$) as follows:

$$dRU_i^{26} = \{18k + r_i^{26} | k \in \mathcal{Z}, 18k + r_i^{26} \in \mathcal{S}_{26}\} \text{ for } i=1, 2, 3, \ldots, 18$$

$$dRU_i^{52} = \{8k + r_i^{52} | k \in \mathcal{Z}, 8k + r_i^{52} \in \mathcal{S}_{52}\} \text{ for } i=1, 2, 3, \ldots, 8$$

$$dRU_i^{106} = \{4k + r_i^{106} | k \in \mathcal{Z}, 4k + r_i^{106}\} \text{ for } i=1, 2, 3, 4$$

$$dRU_i^{242} = \{2k + r_i^{242} | k \in \mathcal{Z}, 2k + r_i^{242} \in \mathcal{S}_{242}\} \text{ for } i=1,2$$

where i denotes the dRU index value, where k is a set of integer values that ranges from 0 to (RU size—1), where $r_i^{26}$, i=1, 2, ..., 9, can be any permutation of the first nine nonnegative even integers, and where $r_i^{26}$, i=10, 11, ..., 18, can be any permutation of the first nine positive odd integers. For example, $\{r_i^{26} | i=1, 2, \ldots, 9\} = \{0, 2, 4, \ldots, 16\}$ and $\{r_i^{26} | i=10, 11, \ldots, 18\} = \{1, 3, 5, \ldots, 17\}$, and $r_i^{52}$, $r_i^{106}$, and $r_i^{242}$ are given in the table below:

| i | 1 | 2 | 3 | 4 | 5 | 6 | 7 | 8 |
|---|---|---|---|---|---|---|---|---|
| $r_i^{52}$ | 0 | 4 | 2 | 6 | 1 | 5 | 3 | 7 |
| $r_i^{106}$ | 0 | 2 | 1 | 3 | | | | |
| $r_i^{242}$ | 0 | 1 | | | | | | |

It follows from the above that the dRUs satisfy the following desirable properties:

$$\cup_{i=1}^{9} dRU_i^{26} \subset dRU_1^{242}, \cup_{i=10}^{18} dRU_i^{26} \subset dRU_2^{242}$$

$$dRU_{2i-1}^{52} \cup dRU_{2i}^{52} \subset dRU_i^{106} \text{ for } i=1, 2, 3, 4$$

$$dRU_{2i-1}^{106} \cup dRU_{2i}^{106} \subset dRU_i^{242} \text{ for } i=1,2.$$

As depicted, there is hierarchical structure where the union of the smaller dRUs is a subset of the larger dRUs. For example, the union of the first 9 values $dRU_i^{26}$ are a subset of the first 242-tone dRU ($dRU_1^{242}$), and the union of the last 9 values $dRU_i^{26}$ are a subset of the second 242-tone dRU ($dRU_2^{242}$). In addition, the union of the first 2 values of the 52-tone dRU ($dRU_1^{52}$ and $dRU_2^{52}$) are a subset of the first 106-tone dRU ($dRU_1^{106}$), and the union of the next 2 values of the 52-tone dRU ($dRU_3^{52}$ and $dRU_4^{52}$) are a subset of the second 106-tone dRU ($dRU_2^{106}$), and so on. Similarly, the union of the first 2 values of the 106-tone dRU ($dRU_1^{106}$ and $dRU_2^{106}$) are a subset of the first 242-tone dRU ($dRU_1^{242}$), and the union of the next 2 values of the 106-tone dRU ($dRU_3^{106}$ and $dRU_4^{106}$) are a subset of the second 242-tone dRU ($dRU_2^{242}$). This relationship helps design the dRU data subcarriers in a non-overlapping fashion by identifying larger dRUs that cannot be used when the smaller subset dRU is used.

Based on the foregoing properties, the following table lists the valid combinations of dRUs and their corresponding number of users which can be supported:

| Valid dRU combination | Number of users supported |
|---|---|
| Combinations of 52-tone, 106-tone, and 242-tone dRUs without overlap | ≤8 |
| $dRU_1^{242} \cup (\cup_{i=10}^{18} dRU_i^{26})$ | ≤10 |
| $(\cup_{i=1}^{18} dRU_i^{106}) \cup (\cup_{i=10}^{18} dRU_i^{26})$ | ≤11 |
| $dRU_1^{106} \cup (\cup_{i=1}^{4} dRU_i^{52}) \cup (\cup_{i=10}^{18} dRU_i^{26})$ | ≤12 |
| $(\cup_{i=1}^{4} dRU_i^{52}) \cup (\cup_{i=10}^{18} dRU_i^{26})$ | ≤13 |
| $\cup_{i=1}^{18} dRU_i^{26}$ | ≤18 |

As depicted, up to 18 users can be supported with an 80 MHz PPDU which allocates 26-tone dRUs using the uniform data tone allocation technique of the present disclosure. Alternatively, up to 13 users can be supported with an 80 MHz PPDU which allocates up to 4 52-tone dRUs and 9 26-tone dRUs using the uniform data tone allocation technique disclosed herein. Alternatively, up to 12 users can be supported with an 80 MHz PPDU which allocates a single 106-tone dRU and up to 2 52-tone dRUs, and 9 26-tone dRUs using the uniform data tone allocation technique disclosed herein. Alternatively, up to 11 users can be supported with an 80 MHz PPDU which allocates up to two 106-tone dRU and 9 26-tone dRUs using the uniform data tone allocation technique disclosed herein. Alternatively, up to 10 users can be supported with an 80 MHz PPDU which allocates a single 242-tone dRU and up to 9 26-tone dRUs using the uniform data tone allocation technique disclosed herein. Finally, up to 8 users can be supported with an 80 MHz PPDU which allocates only the 52-tone, 106-tone, and 242-tone dRUs using the uniform data tone allocation technique disclosed herein.

Distributed RU Design for 80 MHz PPDU

For an 80 MHz PPDU, a 52-tone dRU is a small size dRU, and 106-tone, 242-tone, and 484-tone dRUs are large size dRUs. In order to obtain perfectly uniformly spread data subcarriers over the 80 MHz PPDU, the period of subcarrier indices for each dRU size is given in the following table:

| dRU size | 52-tone | 106-tone | 242-tone | 484-tone |
|---|---|---|---|---|
| period | 18 | 8 | 4 | 2 |

To provide a mathematical description of the dRU subcarrier allocation for an 80 MHz PPDU, $\mathcal{Z}$ again denotes the set of integers that is between 0 and (RU size—1). In addition, $\mathcal{J}_{52}$, $\mathcal{J}_{106}$, $\mathcal{J}_{242}$, and $\mathcal{J}_{484}$ denote the sets of "used subcarriers" for all 52-tone dRUs, all 106-tone dRUs, all 242-tone dRUs, and all 484-tone dRUs over the 80 MHz operation band, respectively. With these denotations, the set of subcarrier indices for each dRU is defined as follows:

$$dRU_i^{52} = \{18k + r_i^{52} | k \in \mathcal{Z}, \ 18k + r_i^{52} \in \mathcal{J}_{52}\} \text{ for } i=1, 2, 3, \ldots, 16$$

$$dRU_i^{106} = \{8k + r_i^{106} | k \in \mathcal{Z}, \ 8k + r_i^{106} \in \mathcal{J}_{106}\} \text{ for } i=1, 2, 3, \ldots, 8$$

$$dRU_i^{242} = \{4k + r_i^{242} | k \in \mathcal{Z}, \ 4k + r_i^{242} \in \mathcal{J}_{242}\} \text{ for } i=1, 2, 3, 4$$

$$dRU_i^{484} = \{2k + r_i^{484} | k \in \mathcal{Z}, \ 2k + r_i^{484} \in \mathcal{J}_{484}\} \text{ for } i=1, 2$$

where i denotes the dRU index value, where k is a set of integer value that ranges from 0 to (RU size—1), where $r_i^{52}$, i=1, 2, ..., 8, can be any permutation of any eight of the first nine nonnegative even integers, $r_i^{52}$, i=9, 10, ..., 16, can be any permutation of any eight of the first nine positive odd integers, i.e., $\{r_i^{52} | i=1, 2, \ldots, 8\} \subset \{0, 2, 4, \ldots, 16\}$ and $\{r_i^{52} | i=9, 10, \ldots, 16\} \subset \{1, 3, 5, \ldots, 17\}$, and $r_i^{106}$, $r_i^{242}$, and $r_i^{484}$ are given in the table below:

| i | 1 | 2 | 3 | 4 | 5 | 6 | 7 | 8 |
|---|---|---|---|---|---|---|---|---|
| $r_i^{106}$ | 0 | 4 | 2 | 6 | 1 | 5 | 3 | 7 |
| $r_i^{242}$ | 0 | 2 | 1 | 2 | | | | |
| $r_i^{484}$ | 0 | 1 | | | | | | |

It follows from the above that the dRUs satisfy the following desirable properties:

$$\cup_{i=1}^{8} dRU_i^{52} \subset dRU_1^{484}, \ \cup_{i=9}^{16} dRU_i^{52} \subset dRU_2^{484}$$

$$dRU_{2i-1}^{106} \cup dRU_{2i}^{106} \subset dRU_i^{242} \text{ for } i=1, 2, 3, 4$$

$$dRU_{2i-1}^{242} \cup dRU_{2i}^{242} \subset dRU_i^{484} \text{ for } i=1, 2$$

Based on these properties, the following table lists the valid combinations of dRUs and their corresponding number of users which can be supported.

| Valid dRU combination | Number of users supported |
|---|---|
| Combinations of 106-tone, 242-tone, and 484-tone dRUs without overlap | ≤8 |
| $dRU_1^{484} \cup (\cup_{i=9}^{16} dRU_i^{52})$ | ≤9 |
| $(\cup_{i=1}^{2} dRU_i^{242}) \cup (\cup_{i=9}^{16} dRU_i^{52})$ | ≤10 |
| $dRU_1^{242} \cup (\cup_{i=3}^{4} dRU_i^{106}) \cup (\cup_{i=9}^{16} dRU_i^{52})$ | ≤11 |
| $(\cup_{i=1}^{4} dRU_i^{106}) \cup (\cup_{i=9}^{16} dRU_i^{52})$ | ≤12 |
| $\cup_{i=1}^{16} dRU_i^{52}$ | ≤16 |

As disclosed herein, there are a number of advantages from the disclosed design methodology for allocating dRU data subcarriers uniformly across the entire spreading frequency without overlap. For example, by allocating subcarriers for each dRU to be perfectly uniformly distributed over the operation bandwidth (excluding a few null subcarriers around DC), the receiver may use a low-complexity design and implementation of subcarrier smoothing, which provides a significant noise reduction benefit in channel estimation. In addition, for a 26-tone dRU in a 40 MHz PPDU and a 52-tone dRU in an 80 MHz PPDU, if the period for subcarrier distribution is 16, then the repetition pattern in the time domain is 0.8 μs. This 0.8 μs repetition pattern is the same as the L-STF field in the PPDU, which could cause false packet detection at neighbor stations. Insofar as the present disclosure avoids using a spreading period of 16 for subcarrier distribution, the resulting dRU tone plan is immune to the aforementioned potential false packet detection problem.

As seen from the foregoing, selected embodiments of the present disclosure provide a method and apparatus for constructing a subcarrier allocation and resource plan for orthogonal frequency division multiple access (OFDMA) resource units (RUs) whose subcarriers are distributed over the entire physical layer protocol data unit (PPDU) bandwidth. In selected embodiments, the subcarrier and resource allocation plan for a 40 MHz PPDU evenly distributes or spreads data subcarriers of 26-tone, 52-tone, 106-tone, and 242-tone dRUs over the entire 40 MHz operating bandwidth. In particular, the data subcarriers for 26-tone dRUs may be perfectly distributed with a period of 18 for each dRU with no overlapped subcarriers between any pair of RUs. In addition, the data subcarriers for 52-tone dRUs may be perfectly distributed with a period of 8 for each RU with no overlapped subcarriers between any pair of RUs. In addition, the data subcarriers for 106-tone dRUs may be perfectly distributed with a period of 4 for each RU with no overlapped subcarriers between any pair of RUs. In addition, the data subcarriers for 242-tone dRUs may be perfectly distributed with a period of 2 for each RU with no overlapped subcarriers between any pair of RUs. In other embodiments, the subcarrier and resource allocation plan for an 80 MHz PPDU evenly distributes or spreads data subcarriers of 52-tone, 106-tone, 242-tone, and 484-tone dRUs over the entire 80 MHz operating bandwidth. In particular, the data subcarriers for 52-tone dRUs may be perfectly distributed with a period of 18 for each dRU with no overlapped subcarriers between any pair of RUs. In addition, the data subcarriers for 106-tone dRUs may be perfectly distributed with a period of 8 for each RU with no overlapped subcarriers between any pair of RUs. In addition, the data subcarriers for 242-tone dRUs may be perfectly distributed with a period of 4 for each RU with no overlapped subcarriers between any pair of RUs. In addition, the data subcarriers for 484-tone dRUs may be perfectly distributed with a period of 2 for each RU with no overlapped subcarriers between any pair of RUs.

Figure 18:
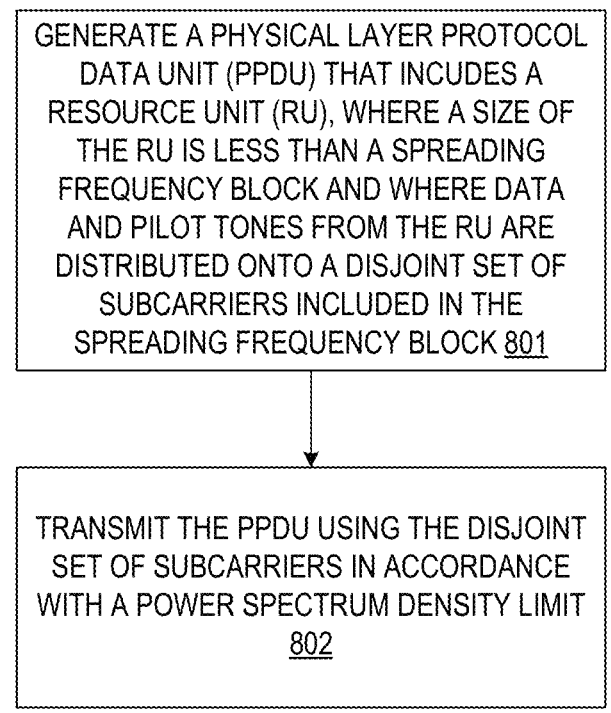
FIG. 18 illustrates a flow diagram of a technique for wireless communications in accordance with selected embodiments of the present disclosure.

Turning now to FIG. 18, there is depicted a flow diagram 18 of a technique for wireless communications in accordance with selected embodiments of the present disclosure. At block 801, a PPDU that includes an RU may be generated, where a size of the RU is less than a signal bandwidth of a spreading frequency block and where data and pilot tones from the RU are distributed onto a disjoint set of subcarriers included in the spreading frequency block. At block 802, the PPDU using the disjoint set of subcarriers may be transmitted in accordance with a PSD limit.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD). Alternatively, embodiments of the invention may be implemented entirely in hardware or in an implementation containing both hardware and software elements. In embodiments which use software, the software may include but is not limited to firmware, resident software, microcode, etc.

By now it should be appreciated that there has been provided a wireless communication apparatus, method, and system for generating and transmitting a Physical Layer Protocol Data Unit (PPDU) in which data and/or pilot tones of a resource unit (RU) are distributed in accordance with an Extremely High Throughput (EHT) communication protocol and other next-generation wireless protocols. In the disclosed methodology, a PPDU is generated that includes a resource unit (RU) with all tones distributed over a spreading frequency block that is larger than a bandwidth of the RU, thereby forming a distributed RU (dRU). To generate the PPDU, a predetermined pilot tone mapping plan identifies a disjoint set of pilot subcarriers within the distributed RU (dRU). In addition, the method transmits the PPDU in the spreading frequency block in accordance with a power spectrum density (PSD) limit by using the disjoint set of pilot subcarriers. In selected embodiments, the predetermined pilot tone mapping plan distributes pilot tones from each RU to the disjoint set of pilot subcarriers using a pilot spreading rule that is identical to a data spreading rule used to distribute data tones onto a disjoint set of data subcarriers included in the spreading frequency block. In other selected embodiments, the predetermined pilot tone mapping plan defines a first set of pilot locations for a plurality of distributed RUs having a RU size (RU size) by shifting a first logical pilot location by a different shift value corresponding to the RU index i as k=mod(i-1:RU size)+1. In other selected embodiments, the predetermined pilot tone mapping plan defines pilot tone indices for a plurality of distributed RUs having a size (RU size) which are evenly spread across the spreading frequency block, where each of the plurality of distributed RUs has j pilot tones. In other selected embodiments, the predetermined pilot tone mapping plan defines a first set of pilot locations for a plurality of i distributed RUs having a smallest size by shifting a first pilot location by a different shift value for each of the plurality of i distributed RUs having the smallest size. In such embodiments, the first set of pilot locations are logical locations within a distributed RU or are absolute locations within the spreading frequency block. In other embodiments, the predetermined pilot tone mapping plan defines, for each of a plurality of j distributed RUs composed from a pair of different distributed RUs from the first plurality of i distributed RUs, a second set of pilot locations which are a union of the first set of pilot locations from the pair of different distributed RUs, where each of the plurality of j distributed RUs has a larger size tan the plurality of i distributed RUs. In other such embodiments, the predetermined pilot tone mapping plan defines a second set of pilot locations for each of a plurality of j distributed RUs having a larger size than the plurality of i distributed RUs being a union of the first set of pilot locations of a plurality of i distributed RUs that composes each of the plurality of j distributed RUs, and then applies a down-selection rule to the second set of pilot locations to define a third set of pilot locations for each of the plurality of j distributed RUs having a larger size than the plurality of i distributed RUs, where the third set of pilot locations has only half the pilot locations as the second set of pilot locations. In such embodiments, the down-selection rule is applied uniformly as the same rule for all the plurality of j distributed RUs. In selected embodiments, a predetermined data tone mapping plan controls how each data tone from the RU is distributed onto a disjoint set of data subcarriers included in the spreading frequency block so that allocated data subcarriers for each size of distributed RU are uniformly spread over the entire spreading block frequency. In selected embodiments, the PPDU is generated by encoding a data portion of the PPDU using an encoding bandwidth and distributing pilot tones from the RU onto the disjoint set of pilot subcarriers across the spreading frequency block. In such embodiments where the encoding bandwidth is 20 MHz and the spreading frequency block is 40 MHz, the predetermined pilot tone mapping plan distributes the disjoint set of pilot subcarriers to have a minimum spacing of 10 or 11 subcarriers between each pilot subcarrier. In other embodiments where the encoding bandwidth is 40 MHz and the spreading frequency block is 80 MHz, the predetermined pilot tone mapping plan distributes the disjoint set of pilot subcarriers to have a minimum spacing of 10 or 11 subcarriers between each pilot subcarrier.

In another form, there is provided a wireless device, system, and associated method of operation. As disclosed, the wireless device includes a process that is configured to generate a Physical Layer Protocol Data Unit (PPDU) and to transmit the PPDU in a spreading frequency block. In particular, the processor is configured to generate the PPDU to include a resource unit (RU) having a size that is less than the spreading frequency block. To the end, a predetermined pilot tone mapping plan is applied to control how each pilot tone from the RU is distributed onto a disjoint set of pilot subcarriers forming a distributed RU included in the spreading frequency block. In addition, the processor is configured to transmit the PPDU in the spreading frequency block in accordance with a power spectrum density (PSD) limit by using the disjoint set of pilot subcarriers. In selected embodiments, the predetermined pilot tone mapping plan is applied to distribute pilot tones from each RU using a pilot spreading rule that is identical to a data spreading rule used to distribute data tones onto a disjoint set of data subcarriers included in the spreading frequency block. In other embodiments, the predetermined pilot tone mapping plan is used to generate, for a plurality of i RUs having a size (RU size), a corresponding plurality of i distributed RUs by shifting each pilot tone in an $i^{th}$ distributed RU by a pilot logical index shift value k=mod(i-1:RU size)+1. In other embodiments, the predetermined pilot tone mapping plan is used to generate, for a plurality of i RUs having a size (RU size), a corresponding plurality of i distributed RUs which each have j pilot tones which are evenly spread across the spreading frequency block. In other embodiments, the predetermined pilot tone mapping plan defines a first set of pilot locations for a plurality of i distributed RUs having a smallest size by shifting a first logical pilot location by a different shift value for each of the plurality of i distributed RUs having the smallest size. In other embodiments, the predetermined pilot tone mapping plan applies a plurality of predetermined offsets to the first logical pilot location to define a second set of pilot locations for each of a plurality of j distributed RUs having a larger size than the plurality of i distributed RUs. In other embodiments, the predetermined pilot tone mapping plan applies a plurality of predetermined offsets to the first logical pilot location to define a second set of pilot locations for each of a plurality of j distributed RUs having a larger size than the plurality of i distributed RUs, and then applies a down-selection rule to the second set of pilot locations to define a third set of pilot locations for each of a plurality of j distributed RUs having a larger size than the plurality of i distributed RUs, where the third set of pilot locations has only half the pilot locations as the second set of pilot locations. In other embodiments, the predetermined data tone mapping plan controls how each data tone from the RU is distributed onto a disjoint set of data subcarriers included in the spreading frequency block so that allocated data subcarriers for each size of distributed RU are uniformly spread over the entire spreading block frequency.

Although the described exemplary embodiments disclosed herein are directed to a wireless communication station (STA) devices which use PPDUs with distributed RUs in selected 802.11be-compliant wireless connectivity applications and methods for operating same, the present invention is not necessarily limited to the example embodiments which illustrate inventive aspects of the present invention that are applicable to a wide variety of circuit designs and operations. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the identification of the circuit design and configurations provided herein is merely by way of illustration and not limitation and other circuit arrangements or pilot/data tone index values may be used in order. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts. When implemented in hardware, the hardware may comprise one or more of discrete components, an integrated circuit, an application-specific integrated circuit (ASIC), a programmable logic device (PLD), etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wireless communication method, comprising:
   generating a Physical Layer Protocol Data Unit (PPDU) that includes a resource unit (RU) with all tones distributed over a spreading frequency block that is larger than a bandwidth of the RU, thereby forming a distributed RU (dRU), wherein a predetermined pilot tone mapping plan identifies a disjoint set of pilot subcarriers within the dRU; and
   transmitting the PPDU in the spreading frequency block in accordance with a power spectrum density (PSD) limit by using the disjoint set of pilot subcarriers.

2. The wireless communication method of claim 1, wherein transmitting the PPDU comprises transmitting the PPDU using Orthogonal Frequency-Division Multiple Access (OFDMA).

3. The wireless communication method of claim 1, wherein the predetermined pilot tone mapping plan distributes pilot tones from each RU to the disjoint set of pilot subcarriers using a pilot spreading rule that is identical to a data spreading rule used to distribute data tones onto a disjoint set of data subcarriers included in the spreading frequency block.

4. The wireless communication method of claim 1, wherein the predetermined pilot tone mapping plan defines a first set of pilot locations for a plurality of distributed RUs having a RU size (RU size) by shifting a first logical pilot location by a different shift value corresponding to the RU index i as k=mod(i-1:RU size)+1.

5. The wireless communication method of claim 1, wherein the predetermined pilot tone mapping plan defines pilot tone indices for a plurality of distributed RUs having a size (RU size) which are evenly spread across the spreading frequency block, where each of the plurality of distributed RUs has j pilot tones.

6. The wireless communication method of claim 1, wherein the predetermined pilot tone mapping plan defines a first set of pilot locations for a plurality of i distributed RUs having a smallest size by shifting a first pilot location by a different shift value for each of the plurality of i distributed RUs having the smallest size.

7. The wireless communication method of claim 6, wherein the first set of pilot locations are logical locations within a distributed RU or are absolute locations within the spreading frequency block.

8. The wireless communication method of claim 6, wherein the predetermined pilot tone mapping plan defines, for each of a plurality of j distributed RUs composed from a pair of different distributed RUs from the first plurality of i distributed RUs, a second set of pilot locations which are a union of the first set of pilot locations from the pair of different distributed RUs, where each of the plurality of j distributed RUs has a larger size than the plurality of i distributed RUs.

9. The wireless communication method of claim 8, wherein the predetermined pilot tone mapping plan applies a down-selection rule to the second set of pilot locations to define a third set of pilot locations for each of the plurality of j distributed RUs having a larger size than the plurality of i distributed RUs, where the third set of pilot locations has only half the pilot locations as the second set of pilot locations.

10. The wireless communication method of claim 9, wherein the down-selection rule is applied uniformly to all the plurality of j distributed RUs.

11. The wireless communication method of claim 1, wherein a predetermined data tone mapping plan controls how each data tone from the RU is distributed onto a disjoint set of data subcarriers included in the spreading frequency block so that allocated data subcarriers for each size of distributed RU are uniformly spread over the entire spreading block frequency.

12. The wireless communication of claim 1, wherein generating the PPDU comprises encoding a data portion of the PPDU using an encoding bandwidth and distributing pilot tones from the RU onto the disjoint set of pilot subcarriers across the spreading frequency block.

13. The wireless communication of claim 12, wherein the encoding bandwidth is 20 MHz and the spreading frequency block is 40 MHz, and wherein the predetermined pilot tone mapping plan distributes the disjoint set of pilot subcarriers to have a minimum spacing of 10 or 11 subcarriers between each pilot subcarrier.

14. The wireless communication of claim 12, wherein the encoding bandwidth is 40 MHz and the spreading frequency block is 80 MHz, and wherein the predetermined pilot tone mapping plan distributes the disjoint set of pilot subcarriers to have a minimum spacing of 10 or 11 subcarriers between each pilot subcarrier.

15. A wireless device, comprising:
a processor configured to:
generate a Physical Layer Protocol Data Unit (PPDU) comprising a resource unit (RU), wherein a size of the RU is less than a spreading frequency block, wherein a predetermined pilot tone mapping plan controls how each pilot tone from the RU is distributed onto a disjoint set of pilot subcarriers forming a distributed RU included in the spreading frequency block; and
transmit the PPDU in the spreading frequency block in accordance with a power spectrum density (PSD) limit by using the disjoint set of pilot subcarriers.

16. The wireless device of claim 13, wherein the predetermined pilot tone mapping plan distributes pilot tones from each RU using a pilot spreading rule that is identical to a data spreading rule used to distribute data tones onto a disjoint set of data subcarriers included in the spreading frequency block.

17. The wireless device of claim 15, wherein the predetermined pilot tone mapping plan is used to generate, for a plurality of i RUs having a size (RU size), a corresponding plurality of i distributed RUs by shifting each pilot tone in an $i^{th}$ distributed RU by a pilot logical index shift value k=mod(i-1:RU size)+1.

18. The wireless device of claim 15, wherein the predetermined pilot tone mapping plan is used to generate, for a plurality of i RUs having a size (RU size), a corresponding plurality of i distributed RUs which each have j pilot tones which are evenly spread across the spreading frequency block.

19. The wireless device of claim 15, wherein the predetermined pilot tone mapping plan defines a first set of pilot locations for a plurality of i distributed RUs having a smallest size by shifting a first logical pilot location by a different shift value for each of the plurality of i distributed RUs having the smallest size.

20. The wireless device of claim 19, wherein the predetermined pilot tone mapping plan applies a plurality of predetermined offsets to the first logical pilot location to define a second set of pilot locations for each of a plurality of j distributed RUs having a larger size than the plurality of i distributed RUs.

21. The wireless device of claim 19, wherein the predetermined pilot tone mapping plan applies a plurality of predetermined offsets to the first logical pilot location to define a second set of pilot locations for each of a plurality of j distributed RUs having a larger size than the plurality of i distributed RUs, and then applies a down-selection rule to the second set of pilot locations to define a third set of pilot locations for each of a plurality of j distributed RUs having a larger size than the plurality of i distributed RUs, where the third set of pilot locations has only half the pilot locations as the second set of pilot locations.

22. The wireless device of claim 15, wherein a predetermined data tone mapping plan controls how each data tone from the RU is distributed onto a disjoint set of data subcarriers included in the spreading frequency block so that allocated data subcarriers for each size of distributed RU are uniformly spread over the entire spreading block frequency.

* * * * *